(12) United States Patent
Miller et al.

(10) Patent No.: US 9,644,063 B2
(45) Date of Patent: May 9, 2017

(54) ORDERED ARCHITECTURES IN ACRYLIC POLYMERS

(75) Inventors: Brandon S. Miller, Lock Haven, PA (US); Kyle R. Heimbach, Millmont, PA (US); William L. Bottorf, Mill Hall, PA (US); Christopher Lester, Mill Hall, PA (US); Eric L. Bartholomew, Mill Hall, PA (US)

(73) Assignee: Avery Dennison Corporation, Glendale, CA (US)

( * ) Notice: Subject to any disclaimer, the term of this patent is extended or adjusted under 35 U.S.C. 154(b) by 101 days.

(21) Appl. No.: 13/697,696

(22) PCT Filed: May 17, 2011

(86) PCT No.: PCT/US2011/036769
§ 371 (c)(1),
(2), (4) Date: Nov. 13, 2012

(87) PCT Pub. No.: WO2011/146450
PCT Pub. Date: Nov. 24, 2011

(65) Prior Publication Data
US 2013/0059971 A1 Mar. 7, 2013

Related U.S. Application Data

(60) Provisional application No. 61/346,056, filed on May 19, 2010.

(51) Int. Cl.
| | | |
|---|---|---|
| C08F 220/68 | (2006.01) |
| C09J 133/08 | (2006.01) |
| C09J 133/26 | (2006.01) |
| C08F 293/00 | (2006.01) |

(52) U.S. Cl.
CPC ...... *C08F 293/005* (2013.01); *C08F 2438/03* (2013.01)

(58) Field of Classification Search
CPC C08F 293/00; C08F 293/005; C08F 297/048; C08F 2438/03
USPC .......................... 525/242, 299; 524/543, 560
See application file for complete search history.

(56) References Cited

U.S. PATENT DOCUMENTS

| | | |
|---|---|---|
| 4,912,169 A | 3/1990 | Whitmire et al. |
| 5,602,221 A | 2/1997 | Bennett et al. |
| 6,465,591 B1 | 10/2002 | Lee |
| 6,569,949 B1 | 5/2003 | Lee et al. |
| 6,596,899 B1 | 7/2003 | Lai |
| 6,608,134 B1 | 8/2003 | Tobing et al. |
| 6,706,836 B1 | 3/2004 | Holguin et al. |
| 6,743,880 B2 | 6/2004 | Holguin |
| 6,780,231 B2 | 8/2004 | Scholz et al. |
| 6,828,339 B2 | 12/2004 | Ettema et al. |
| 6,844,391 B1 | 1/2005 | Iyer et al. |
| 6,953,602 B2 | 10/2005 | Carte et al. |
| 7,019,067 B2 | 3/2006 | Holguin et al. |
| 7,407,694 B2 | 8/2008 | Taniguchi |
| 7,459,193 B2 | 12/2008 | Utz |
| 2002/0086950 A1 | 7/2002 | Ohrbom |
| 2004/0097658 A1* | 5/2004 | Everaerts et al. ............ 525/244 |
| 2004/0266965 A1 | 12/2004 | Holguin et al. |
| 2006/0089423 A1 | 4/2006 | Ueno et al. |
| 2006/0173142 A1 | 8/2006 | Nava et al. |
| 2006/0263600 A1 | 11/2006 | Bartholomew et al. |
| 2006/0286302 A1* | 12/2006 | Ma et al. .................... 427/372.2 |
| 2007/0009582 A1 | 1/2007 | Madsen et al. |
| 2007/0049696 A1* | 3/2007 | Gonzalez Montiel et al. ............................. 525/242 |
| 2007/0149709 A1 | 6/2007 | Parker |
| 2008/0214712 A1 | 9/2008 | Passade Boupat et al. |
| 2009/0130363 A1 | 5/2009 | Utz |
| 2009/0171459 A1 | 7/2009 | Linhardt et al. |
| 2010/0047620 A1 | 2/2010 | Decker et al. |
| 2010/0280182 A1* | 11/2010 | Balk et al. .................... 525/217 |
| 2011/0118372 A1 | 5/2011 | Lester |
| 2011/0177302 A1 | 7/2011 | Takita |
| 2014/0329958 A1 | 11/2014 | Lester |

FOREIGN PATENT DOCUMENTS

| | | |
|---|---|---|
| CN | 101528782 | 9/2009 |
| CN | 102037091 | 4/2011 |
| EP | 1211270 | 6/2002 |
| JP | 2009-108203 | 5/2009 |
| WO | 98/01478 | 1/1998 |
| WO | 99/05099 | 2/1999 |
| WO | 99/31144 | 6/1999 |

(Continued)

OTHER PUBLICATIONS

Benedek, I. Pressure-Sensitive Adhesives and Applications pp. 90-92 CRC Press Feb. 2004.*
Titow, M.V. PVC Technology p. 960 and 962 Springer Science & business Media (Dec. 6, 2012).*
International Search Report and Written Opinion issued in corresponding IA No. PCT/US2011/036769 dated Aug. 1, 2011.
Wang, J., Matyjaszewski, K., "Controlled/"Living" Radical Polymerization. Atom Transfer Radical Polymerization in the Presence of Transition-Metal Complexes", J. Am. Chem. Soc., 117: 5614-5615 (1995).
Cowie, J. M. G., Arrighi, V., Polymers: Chemistry and Physics of Modern Materials, CRC Press Taylor and Francis Group: Boca Raton, Fl, 2008, 3rd Ed., pp. 82-84.

(Continued)

*Primary Examiner* — Irina S Zemel
*Assistant Examiner* — Jeffrey Lenihan
(74) *Attorney, Agent, or Firm* — Avery Dennison Corporation

(57) ABSTRACT

Polymers having ordered architectures and one or more reactive functional groups incorporated in select blocks or regions of the polymer in particular proportions relative to other regions in the polymer, are described. The polymers are well suited for use in adhesive compositions, and particularly for pressure sensitive adhesive compositions. In addition, various methods for forming the noted polymers and adhesive compositions utilizing the ordered polymers are disclosed.

27 Claims, 15 Drawing Sheets

(56) References Cited

FOREIGN PATENT DOCUMENTS

| WO | 03/055919 | 7/2003 |
|---|---|---|
| WO | 2006/106277 | 10/2006 |
| WO | 2007/023375 | 3/2007 |
| WO | 2007/140225 | 12/2007 |
| WO | WO-2008012116 A1 * | 1/2008 |
| WO | 2009/117654 | 9/2009 |
| WO | 2011/146450 | 11/2011 |

OTHER PUBLICATIONS

Odian, G., Radical Chain Polymerization; Principles of Polymerization, Wiley-Interscience: Staten Island, New York, 2004, pp. 316-321.

Matyjaszewski, K., Xia, J., "Atom Transfer Radical Polymerization", Chem. Rev., 101 (9):2921-2990 (2001).

Mayadunne et al., "Living Radical Polymerization with Reversible Addition-Fragmentation Chain Transfer (RAFT Polymerization) Using Dithiocarbamates as Chain Transfer Agents," Macromolecules, 32 (21), p. 6977-6980, (1999).

Matyjaszewski et al., "Simple and Efficient Synthesis of Various Alkoxyamines for Stable Free Radical Polymerization," Macromolecules, 31 (17), p. 5955-5957, (1998).

Patten, T. E., Matyjaszewski, K., "Atom Transfer Radical Polymerization and the Synthesis of Polymeric Materials", Adv. Mater., 10: 901 (1998).

Chiefari et al., Living Free-Radical Polymerization by Reversible Addition-Fragmentation Chain Transfer: The RAFT Process, Macromolecules, 31 (16), p. 5559-5562, (1998).

International Preliminary Report on Patentability issued in corresponding IA No. PCT/US2009/037800 dated Sep. 30, 2010.

International Search Report and Written Opinion issued in corresponding IA No. PCT/US2009/037800 dated May 28, 2009.

International Search Report and Written Opinion issued in corresponding IA No. PCT/US2012/059849 dated Dec. 4, 2012.

International Preliminary Report on Patentability issued in corresponding IA No. PCT/US2012/059849 dated Apr. 24, 2014.

Jiang P et al., "Synthesis of well-defined glycidyl methacrylate based block copolymers with self-activation and self-initiation behaviors via ambient temperature atom transfer radical polymerization", Journal of Polymer Science Part A: Polymer Chemistry, 2007, vol. 45, pp. 2947-2958.

Yan et al., "Dual-sensing porphyrin-containing copolymer nanosensor as full-spectrum colorimeter and ultra-sensitive thermometer," Chemical Communications, 2010, 46, 2781-2783.

Kenawy et al., "Biologically active polymers v. sythesis and antimicrobial activity of modified poly(glycidyl methacrylate-co-2-hydroxyethyl methacrylate) derivatives with quaternary ammonium and phosphonium salts," Journal of Polymer Science: Part A, Polymer Chemistry, vol. 40, 2384-2393, 2002.

Fan et al., "Synthesis of SAN-containing block copolymers using RAFT polymerization," Journal of Polymer Science, Part A, 2006, 44, 2260-2269.

Schilli et al., "A new double-responsive block copolymer synthesized via RAFT polymerization: poly(n-isopropylacrylamide)-block-poly(acrylic acid)," Macromolecules 2004, 37, 7861-7866.

Schmitz et al., "Synthesis and aggregation behaviour of amphiphilic block copolymers with random middle block," Colloid Polymer Science, 2009, 287:1183-1193.

International Preliminary Report on Patentability issued in corresponding IA No. PCT/US2011/036769 dated Nov. 29, 2012.

Hu Y., Paul C.W., Block Copolymer-Based Hot-Melt Pressure-Sensitive Adhesives in: Technology of Pressure-Sensitive Adhesives and Products (Handbook of Pressure-Sensitive Adhesives and Products) Edited by Istvan Benedek and Mikhail M. Feldstein, CRC Press 2008, pp. 3-6 and pp. 3-7.

* cited by examiner

ORDERED ARCHITECTURES IN ACRYLIC POLYMERS

CROSS REFERENCE TO RELATED APPLICATION

The present application is a 371 of International Application No. PCT/US2011/036769, which was published in English on Dec. 1, 2011, which claims priority to U.S. Provisional Application No. 61/346,056 filed May 19, 2010 which is incorporated herein by reference in its entirety.

FIELD OF THE INVENTION

The present invention relates to ordered polymers and particularly, ordered acrylic polymers having specific concentrations of one or more reactive functional groups in select regions of the polymer. The invention also relates to adhesive compositions utilizing the ordered polymers. The invention additionally relates to methods for forming the ordered polymers and the adhesives.

BACKGROUND OF THE INVENTION

It is known in the art that certain polymer structures lead to particular characteristics in the resulting polymer. For example, the presence of long chain branching may improve certain polymer characteristics, such as processability and melt strength. The presence of long chain branching in a polymer is typically characterized by the occurrence of polymer moieties of a length greater than that of any olefin comonomer remnant attached to the main, backbone polymer chain. In prior art techniques, long chain branching may be generated in a polymer by incorporation of a vinyl-terminated macromer (either added or formed in situ during polymerization) either by action of the polymerization catalyst itself or by the use of a linking agent. These methods generally suffer from incomplete incorporation of the vinyl-terminated macromer or linking moiety into the polymer, and/or a lack of control over the extent of long chain branching for given process conditions.

It is also known in the art that selective incorporation of particular moieties at the terminal ends of a polymer may produce polymers having particular physical properties or enable their use in specific applications. Significant research has been conducted into such syntheses and related strategies. Accordingly, controlling polymer structure is a topic of much research.

It is well known that acrylic polymers may be produced having a variety of different forms such as block copolymers, random polymers, and telechelic polymers. Acrylic polymers are used in a wide array of applications such as adhesive applications, and thus are of great interest to developers and formulators. Techniques are also known for placing functional groups at the ends of acrylic polymer chains in order to increase molecular weight. Modifying molecular weight and other characteristics of acrylic polymers enables adjustment of properties of adhesive compositions when such polymers are used therein. Although satisfactory in certain aspects, a significant need remains for producing polymers for adhesive formulations that have particular structures in order to provide desired end properties associated with the adhesive formed from the polymer.

As far as is known, currently known strategies do not enable precise placement of monomers with functional groups in particular regions of a polymer. Moreover, currently known strategies do not provide polymers having particular concentrations or loading densities of functional groups in select regions of the polymers, and particularly polymers having precise weight ratio concentrations of functional groups in different regions of the polymers. Accordingly, a need exists for such methods and for polymers having ordered architectures produced using such methods.

SUMMARY OF THE INVENTION

The difficulties and drawbacks associated with previous attempts to produce particular functional group arrangements in polymers with specified functional group densities are addressed in the present invention for polymers having an ordered architecture, adhesives utilizing such ordered polymers, and related methods of forming the adhesives.

In one aspect, the present invention provides an ordered polymer comprising at least two different blocks and at least one reactive functional group apportioned between the at least two blocks in an apportionment ratio of from 2:1 to 90:1. In a preferred embodiment, the at least two different blocks include a first block selected from the group consisting of acrylate monomers, methacrylate monomers, and combinations thereof; and a second block including a polymerizable acrylate comonomer. The first and second blocks include at least one reactive functional group selected from the group consisting of acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, silyl groups, carboxyl groups, carbonyl groups, carbonate ester groups, isocyanato groups, amino groups, amide groups, imide groups, mercapto groups, acetoacetyl groups, and combinations thereof.

In another aspect, the present invention provides an adhesive composition comprising an ordered polymer including at least two different blocks and at least one reactive functional group apportioned between the at least two blocks in an apportionment ratio of from 2:1 of 90:1. In a preferred embodiment, the at least two different blocks include a first block selected from the group consisting of acrylate monomers, methacrylate monomers, and combinations thereof; and a second block including a polymerizable acrylate comonomer. The first and second blocks include at least one reactive functional group selected from the group consisting of acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, silyl groups, carboxyl groups, carbonyl groups, carbonate ester groups, isocyanato groups, amino groups, amide groups, imide groups, mercapto groups, acetoacetyl groups, and combinations thereof.

In yet another aspect, the present invention provides a method of preparing an adhesive composition. The method comprises forming an ordered polymer by living polymerization whereby the ordered polymer comprises at least two different blocks and at least one reactive functional group apportioned between the at least two blocks in an apportionment ratio of from 2:1 to 90:1. The method also comprises crosslinking the ordered polymer by mixing the ordered polymer with an effective amount of one or more crosslinking agent(s). And, the method comprises drying the crosslinked ordered polymer.

As will be realized, the invention is capable of other and different embodiments and its several details are capable of modifications in various respects, all without departing from the invention. Accordingly, the description is to be regarded as illustrative and not restrictive.

BRIEF DESCRIPTION OF THE DRAWINGS

FIG. 1 also illustrates a corresponding polymer and reactive functional groups formed using conventional random polymerization techniques.

DETAILED DESCRIPTION OF THE EMBODIMENTS

Figure 1:
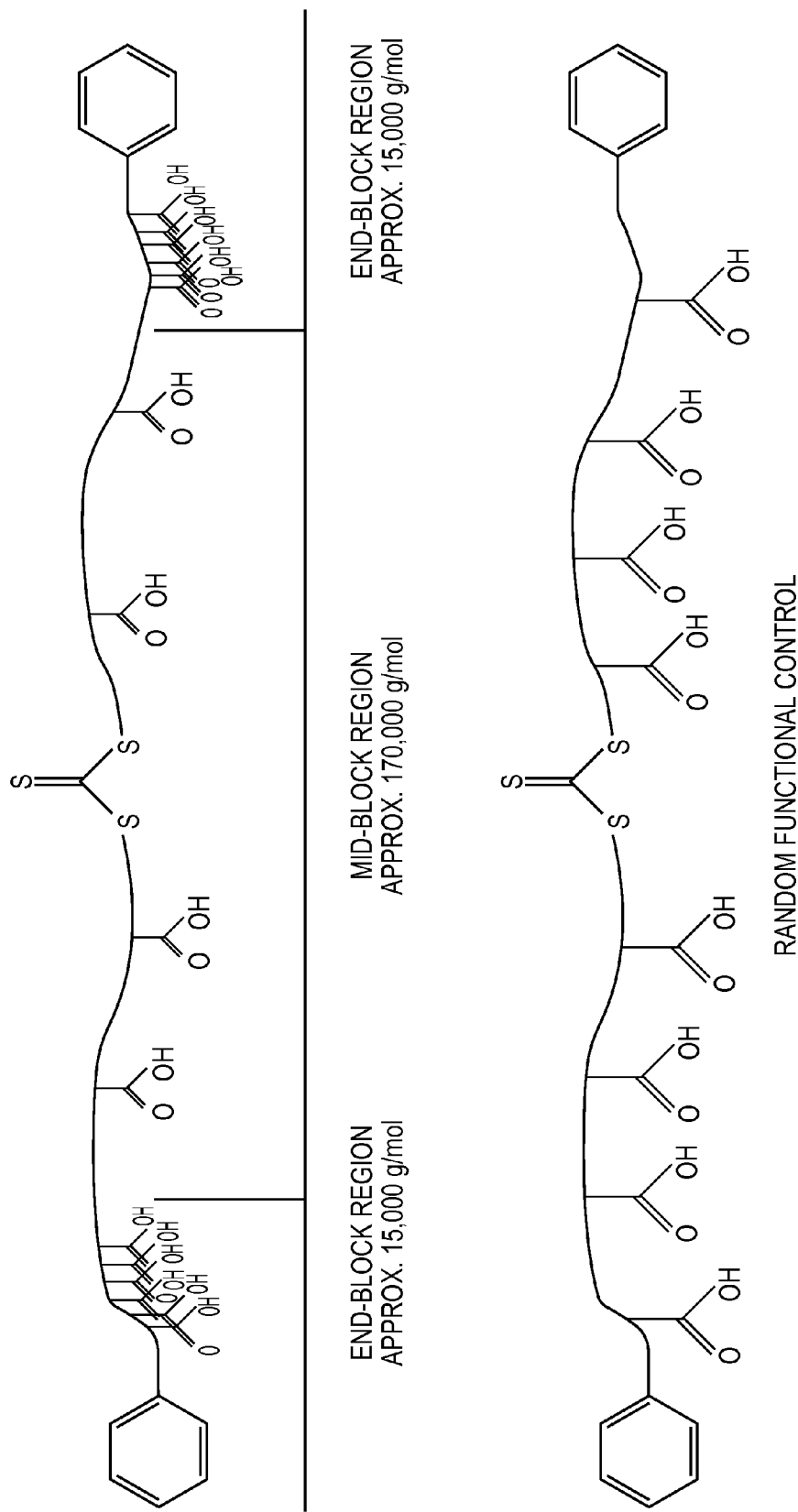
FIG. 1 is a schematic representation of a preferred polymer having a reactive functional group selectively located within particular regions of the polymer, in accordance with the present invention.

The present invention provides a novel class of ordered polymers that can be used in a wide array of different applications, and in particular as a constituent or as an additive in pressure sensitive adhesives. Incorporation of the ordered polymers into an adhesive composition has been discovered to significantly enhance properties of the resulting adhesive. In accordance with the present invention, by selectively incorporating one or more reactive functional groups at desired concentrations or proportions within select regions of the polymer molecule, for example incorporating a functional group in a higher concentration in end regions of the polymer as compared to inner regions of the polymer, the resulting polymer can be used in pressure sensitive adhesives that exhibit enhanced cohesion adhesion balance. A particular example is as follows. An acrylic polymer can be produced that exhibits very high peel adhesion in conjunction with high static shear and high temperature shear. By selectively controlling the concentration and position of the functional groups within the polymer, molecular mass can be increased by crosslinking in a manner such that desirable adhesive properties are not detrimentally affected. Accordingly, the ordered polymers as described herein can be lower in molecular weight than conventional free-radically derived polymers and therefore, the ordered polymers can be made and used at a relatively high solids content in solvents or can be used at 100% solids content such as in a hot/warm melt adhesive.

More specifically, the present invention provides ordered polymers having one or more reactive functional groups incorporated in select blocks or regions of the polymer at designated concentrations within those regions. Preferably, the polymers are acrylic polymers. The reactive functional groups can be incorporated in the polymers by one or more polymerizable monomers as described herein. Thus, a polymerizable monomer and/or comonomer as described herein may constitute one or more reactive functional groups. The present invention additionally provides adhesives utilizing the ordered polymers. The present invention also provides methods of forming the ordered polymers and the adhesives. The methods of forming the polymers are based upon one or more techniques of controlled radical polymerization. These aspects are all described in greater detail herein.

Ordered Polymers

Generally, the ordered polymers comprise at least two blocks or regions different from one another, located anywhere along the polymer backbone or chain, or elsewhere within the polymer. Thus, an ordered polymer as described herein may contain one or more A blocks, one or more B blocks, and one or more C blocks anywhere within the polymer. The preferred polymers may comprise other types of blocks or regions such as D blocks, E blocks . . . etc. In a preferred aspect, particular amounts of reactive functional groups are provided in association with at least two of the blocks, referred as blocks A and B for purposes of convenience. And, in a more preferred aspect, the amounts of reactive functional groups are controlled in the blocks A and B such that the total amount of a reactive functional group is distributed between two blocks, for example blocks A and B, within a certain range of weight ratios. Generally, this ratio is referred to herein as an "apportionment ratio" and is defined as the ratio of the weight percent of a reactive functional group associated with block A to the weight percent of the reactive functional group associated with block B. Generally, a useful range of ratios, i.e. apportionment ratios, for the ordered polymers described herein is from about 1.1:1 to about 10,000:1. Preferably, the apportionment ratios of the ordered polymers are from 1.1:1 to 1,000:1, more preferably from 1.1:1 to 100:1, and most preferably from 6:1 to 80:1. However, it will be appreciated that the present invention includes polymers with one or more reactive functional groups distributed between polymeric blocks at apportionment ratios less than or greater than these ranges. For example, the invention includes polymers as described herein however having apportionment ratios in excess of 10,000:1, such as for example about 50,000:1, about 75,000:1, and about 100,000:1.

The ordered polymers are preferably formed from (i) monomers of acrylates and/or methacrylates and (ii) polymerizable acrylate comonomers having one or more reactive functional groups. The term "monomer" or "comonomer" as used herein refers to a molecule, starting unit, or chemical species that can bond together to form a polymer. The term also includes a repeating unit within the polymer. As noted, these monomers or comonomers are generally referred to herein as blocks or regions such as "A", "B", and/or "C". The acrylate monomers include $C_1$ to about $C_{20}$ alkyl, aryl or cyclic acrylates such as methyl acrylate, ethyl acrylate, phenyl acrylate, butyl acrylate, 2-ethylhexyl acrylate, isobornyl acrylate and functional derivatives of these acrylates such as 2-hydroxy ethyl acrylate, 2-chloro ethyl acrylate, and the like. These compounds typically contain from about 3 to about 20 carbon atoms, and in one embodiment about 3 to about 8 carbon atoms. The methacrylate monomers include $C_1$ to about $C_{20}$ alkyl, aryl or cyclic methacrylates such as methyl methacrylate, ethyl methacrylate, butyl methacrylate, 2-ethylhexyl methacrylate, phenyl methacrylate, isobornyl methacrylate, and functional derivatives of these methacrylates such as 2-hydroxyethyl methacrylate, 2-chloroethyl methacrylate, and the like. These compounds typically contain from about 4 to about 20 carbon atoms, and in one embodiment about 4 to about 8 carbon atoms. Combinations of acrylates and methacrylates can also be used.

Although the ordered polymers preferably comprise (i) monomers of acrylates and/or methacrylates, and (ii) polymerizable acrylate comonomers, i.e. blocks A and B, the present invention includes the use of additional and/or different monomers as blocks in the polymer. Nearly any free radically polymerizable monomer or combination of monomers could be used as blocks A, B, C, D, E, etc. in the ordered polymers described herein. Accordingly, it will be understood that in no way is the invention limited to the ordered polymers including acrylate and/or methacrylate blocks.

Table 1 set forth below lists representative, exemplary weight percentages of a reactive functional group in blocks A and B in an ordered polymer as described herein, and also lists the corresponding weight ratio of that reactive functional group as apportioned between blocks A and B. It will be appreciated that in no way is the invention limited to the particular weight percentages or to the particular weight ratios noted in Table 1. Instead, Table 1 is presented merely to further illustrate the apportionment ratios described herein, i.e. the weight ratio of a reactive functional group in blocks A and B, in a polymer. For example, the first row in Table 1 refers to an ordered polymer having at least two different blocks, e.g. blocks A and B, and a reactive functional group within each block. The weight percent concentration of the reactive functional group in block A is 28.38%, based upon the weight of block A. And, the weight percent concentration of the reactive functional group in block B is 0.46%, based upon the weight of block B. Therefore, the apportionment ratio of the particular reactive functional group within the polymer, is 62:1. Selective placement of the blocks A and B, within a polymer then enables the formation of polymers having desired concentrations of specific reactive functional groups within one or more select regions of the polymer.

TABLE 1

Representative Weight Percents of Reactive Functional Group in Blocks A and B, and Corresponding Apportionment Ratio

| Block/Region A | Block/Region B | Ratio A:B |
|---|---|---|
| 28.38% | 0.46% | 62:1 |
| 25.23% | 0.92% | 27:1 |
| 22.07% | 1.37% | 16:1 |
| 15.77% | 2.29% | 7:1 |
| 6.31% | 3.67% | 1.7:1 |

The polymerizable monomers and comonomers can include as reactive functional groups acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, and mixtures of two or more groups thereof. It is also contemplated to include silyl groups, carboxyl groups, carbonyl groups, carbonate ester groups, isocyanato groups, amino groups, amide groups, imide groups, mercapto groups, and acetoacetyl groups in any combination and/or in combination with one or more of any of the previously noted groups.

The acrylonitrile groups can include acrylonitrile and alkyl substituted acrylonitriles. The alkyl groups typically contain from 1 to about 20 carbon atoms, and in one embodiment from 1 to about 10 carbon atoms, and in another embodiment from 1 to about 5 carbon atoms. Examples include methacrylonitrile and ethacrylonitrile.

The acrylamide groups can include acrylamide and its derivatives including the N-substituted alkyl and aryl derivatives thereof. These include N-methyl acrylamide, N,N-dimethyl acrylamide, t-octyl acrylamide, N-aminoethyl acrylate, N-aminoethyl methacrylate, and the like.

The methacrylamide groups can include methacrylamide and its derivatives including the N-substituted alkyl and aryl derivatives thereof.

The vinyl ester groups can include vinyl acetate, vinyl propionate, vinyl butyrate, vinyl valerate, vinyl versitate, vinyl isobutyrate, and the like.

The vinyl ether groups can include vinyl ethers having 1 to about 8 carbon atoms including ethylvinyl ether, butylvinyl ether, 2-ethylhexylvinyl ether, and the like.

The vinyl amide groups can include vinyl amides having 1 to about 8 carbon atoms including vinyl pyrrolidone, and the like.

The vinyl ketone groups can include vinyl ketones having 1 to about 8 carbon atoms including ethylvinyl ketone, butylvinyl ketone, and the like.

The styrene groups can include styrene, indene, and substituted styrenes represented by the formula (I):

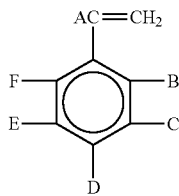

(I)

wherein each of A, B, C, D, E and F is independently selected from hydrogen, $C_1$ to about $C_4$ alkyl or alkoxy groups (especially methyl or methoxy groups) halogroups (especially chloro), thio, cyano, carboxylic acid or ester, or fluorinated alkyl groups of 1 to about 4 carbon atoms. Examples include methyl styrene (sometimes referred to as vinyl toluene), alpha-methyl styrene, divinylbenzene, chlorostyrene, chloromethyl styrene, and the like.

The halogen-containing groups can include vinyl chloride, vinyl bromide, vinyl fluoride, vinylidene chloride, vinylidene bromide, vinylidene fluoride, halogen substituted propylene monomers, and the like, with vinyl bromide and vinylidene chloride being preferred.

The ionic groups can include sodium vinyl sulfonate, sodium styrene sulfonate, sodium methallyl sulfonate, sodium acrylate, sodium methacrylate, and the like, with sodium vinyl sulfonate, sodium styrene sulfonate and sodium methallyl sulfonate being preferred.

The acid-containing groups can include unsaturated carboxylic acids containing from 3 to about 20 carbon atoms. Preferred groups include acrylic acid, methacrylic acid, vinyl sulfonic acid, itaconic acid, beta carboxyl ethyl acrylate, mono-2-acroyloxypropyl succinate, and the like.

The base-containing groups can include vinyl pyridine and the like.

The olefin groups can include isoprene, butadiene, $C_2$ to about $C_8$ straight chained and branched alpha-olefins such as ethylene, propylene, butylene, isobutylene, diisobutylene, 4-methyl pentene-1, 1-butene, 1-hexene, 1-octene, and the like.

The silane groups can include vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyl-trimethoxysilane, γ-methacryloxypropyltriethoxysilane, γ-methacryloxypropyl-tripropoxysilane, γ-methacryloxydimethoxysilane, γ-methacryloxypropyl-methyldimethoxysilane, γ-methacryloxypropylmethyldiethoxysilane, γ-methacryl-oxypropylmethyldipropoxysilane, γ-methacryloxymethyl-dimethoxysilane, γ-methacryloxymethyltrimethoxysilane, γ-methacryloxymethyl-triethoxy-silane, (methacryloxymethyl) methyldimethoxysilane, (methacryloxymethyl)-methyldiethoxysilane, γ-methacryloxypropyltriacetoxysilane, γ-acryloxypropyltrimethoxy-silane, γ-acryloxypropyltriethoxy-silane, γ-methacryl-oxymethyldiethoxysilane, γ-acryloxypropyltripropoxy-silane, γ-acryloxypropyl-methyldimethoxysilane, γ-acryloxypropylmethyldiethoxysilane, γ-acryloxypropyl-methyldipropoxysilane, and the like.

The epoxy groups can include for example, glycidyl methacrylate and glycidal acrylate.

The hydroxyl groups can include for example hydroxy ethyl acrylate, hydroxyl ethyl methacrylate, hydroxyl isopropyl acrylates, hydroxyl isopropyl methacrylate, hydroxyl butyl acrylate, hydroxyl butyl methacrylate and the like.

The anhydride groups can include for example maleic anhydride, itaconic anhydride, citraconic anhydride and the like.

Representative preferred reactive functional groups for incorporating in the polymers described herein include, but are not limited to, acrylic acid, 2-methacryloxyethylphthalic acid (PAMA), and combinations thereof. It will be appreciated that a wide array of other reactive functional groups can be used instead of or in conjunction with any of these reactive functional groups.

The preferred embodiment polymers may exhibit particular distributions of reactive functional groups throughout the polymer. The distribution of each type of reactive functional group incorporated into a polymer can be expressed in terms of a weight ratio of the weight percent amount of that reactive functional group in one block or region, i.e. block A, and the weight percent amount of that reactive functional group in another block or region, i.e. block B. As noted, this weight ratio is referred to herein as the apportionment ratio. For many applications of interest, it is preferred to incorporate greater amounts of reactive functional groups in an A block of a polymer as compared to amounts of reactive functional groups in a different block, i.e. a B block. Therefore, by strategically locating particular blocks having certain weight percentages of specified reactive functional groups within a polymer, precise polymeric architectures can be produced, each with desired loading and placement of functional groups within the polymer. This strategy enables the formation of polymers having particular blocks located at desired regions within the polymer, and the resulting polymer having particular concentrations of functional groups within the desired regions. For example, it may be desired to produce a polymer having a certain combination of blocks, e.g. A, B, and C, and for such polymer to exhibit a relatively high concentration of functional groups within the interior or other locations of the polymer as compared to other regions such as end regions of the polymer.

The present invention is applicable to a wide array of polymer sizes and weights. Typically, the invention is applicable to polymers having a molecular weight of from about 10,000 to about 300,000, preferably from about 50,000 to about 200,000, and most preferably from about 100,000 to about 150,000. However, it will be understood that in no way is the present invention limited to these molecular weights. It will be appreciated that these molecular weights for the noted polymers are average molecular weights and unless indicated otherwise, are weight average molecular weights.

It will also be understood that the polymers of the invention may include two or more different types of reactive functional groups. Thus, different reactive functional groups can be incorporated into one or more end region(s) and/or into one or more inner regions of the polymer(s) of interest. Therefore, a polymer of the present invention can include 1, 2, 3, or more different reactive functional groups. And, each group can be defined as apportioned along the polymer in a particular ratio as described herein. For example, an ordered polymer can include a first reactive functional group apportioned between blocks A and B at a first apportionment ratio, and a second reactive functional group apportioned between blocks A and B at a second apportionment ratio different from the first apportionment ratio. Moreover, it is also contemplated that the second reactive functional group or a third reactive functional group could be apportioned between one of blocks A and B, and another block, block C. Alternatively, the second or third reactive functional group could be apportioned between a set of blocks different from blocks A and B, such as blocks C and D.

A preferred polymer comprises a first monomer of 2-ethylhexyl acrylate and a second monomer of n-butyl acrylate. As will be appreciated, these constitute repeating blocks within the resulting polymer. Although these blocks may be incorporated into the polymer at various proportions to one another, for the particular polymer under discussion, 2-ethylhexyl acrylate constitutes about 51% and n-butyl acrylate constitutes about 45% of the polymer. A reactive functional group was selected as acrylic acid, and was incorporated into the polymer at a proportion of about 4%. In accordance with the present invention, the resulting polymer exhibited a particular polymer architecture readily distinguishable from architectures obtainable using conventional random polymerization techniques. In the polymer under review, the end block regions were limited to a molecular weight of about 15,000, and the mid-block or intermediate region of polymer was limited to a molecular weight of the resulting polymer is about 200,000.

Using the strategies of the present invention, various polymers can be produced having specific distributions of acrylic acid or other reactive functional group(s) within the polymer. For example, in one aspect, a copolymer can be formed of 2-ethylhexyl acrylate and n-butyl acrylate including acrylic acid as a reactive functional group distributed within the polymer at particular proportions, such as (i) 80% of the acrylic acid located within the end blocks and 20% of the acrylic acid located within the mid-block of the polymer, (ii) 50% of the acrylic acid located within the end blocks and 50% of the acrylic acid located within the mid-block, and (iii) 20% of the acrylic acid located within the end blocks and 80% of the acrylic acid located within the mid-block. In contrast, using conventional random polymerization techniques, for the copolymer under discussion, it is generally only possible to obtain a distribution of 10% of acrylic acid in the end blocks and 90% of the acrylic acid in the mid-block. These polymers are described in greater detail in the descriptions of examples herein.

FIG. 1 illustrates a representative copolymer as described in the present discussion with acrylic acid reactive functional groups selectively located in end block and mid-block regions of the polymer, in accordance with the invention. For comparison, FIG. 1 also illustrates a similar copolymer, however formed using conventional random polymerization techniques. The resulting polymer has acrylic acid groups dispersed along the polymer in a relatively uniform fashion.

Another preferred polymer comprises a first monomer of 2-ethylhexyl acrylate and a second monomer of isobornyl acrylate. These blocks can be incorporated into the polymer at various proportions to one another, however a representative preferred polymer includes about 70% 2-ethylhexyl acrylate and about 20% isobornyl acrylate. A reactive functional group was selected as 2-methacryloxyethylphthalic acid (PAMA), and was used at 10%. In accordance with the invention, the resulting polymer exhibited a particular polymeric architecture distinguishable from architectures resulting from conventional random polymerization techniques. In the polymer under discussion, the end block regions were limited to a molecular weight of about 20,000, and the mid-block region of the polymer was limited to a molecular weight of about 160,000. Upon inclusion of the noted reactive functional group, the resulting polymer molecular weight is about 200,000.

Using the strategies of the present invention, various polymers can be produced having specific distributions of the noted acid reactive functional group within the polymer. For example, in one aspect, a copolymer of 2-ethylhexyl acrylate and isobornyl acrylate can be formed which includes 2-methyacryloxyethylphthalic acid as a reactive functional group distributed within the polymer at particular proportions, such as (i) 70% of the acid in the end blocks and 30% of the acid with the mid-block, (ii) 50% of the acid located within the end blocks and 50% of the acid within the mid-block, and (iii) 30% of the acid located within the end blocks and 70% located within the mid-block. In contrast, using conventional random polymerization techniques for the copolymer under discussion, it is generally only possible to obtain a distribution of 10% of the noted acid in the end blocks, and 90% in the mid-block region of the polymer. These various polymers under discussion, i.e. copolymers of 2-ethylhexyl acrylate and isobornyl acrylate with PAMA as a reactive functional group are believed to provide for a wide range of adhesives uniquely adapted to adhere to low surface energy substrates. These polymers are described in greater detail in conjunction with the examples herein.

Additional details of polymers and in particular, acrylic polymers, are provided in US published patent application 2006/0263600; U.S. Pat. Nos. 6,828,339; 6,743,880; 6,706,836; 6,608,134; 6,569,949; and 6,465,591.

The preferred embodiment ordered polymers can also include other monomers besides the acrylate and/or methacrylate monomers described herein. The selection of the particular one or more other monomers will primarily depend upon the end use application of the resulting ordered polymer.

Methods

Generally, and as described in greater detail herein, the reactive functional group(s) of interest are added to a reaction system at particular times, phases, or junctures of the process to form desired regions of the polymer having particular concentrations or loadings of the reactive functional group(s). However, it is also contemplated that the reactive functional group(s) could be incorporated into the polymerizable monomer prior to polymerization and introduced into the polymer in that manner.

Nearly any method of controlled radical polymerization can be used to form the ordered polymers described herein. Controlled radical polymerization is also known as living polymerization. Living polymerization is a form of addition polymerization where the ability of a growing polymer chain to terminate has been removed. This can be accomplished in a variety of ways. Chain termination and chain transfer reactions are absent and the rate of chain initiation is also much larger than the rate of chain propagation. The result is that the polymer chains grow at a more constant rate than seen in traditional chain polymerization and their lengths remain very similar, i.e. they have a very low polydispersity index. Living polymerization is a popular method for synthesizing block copolymers since the polymer can be synthesized in stages, each stage containing a different monomer. Additional advantages are predetermined molar mass and control over end groups.

A particular type of living polymerization is free radical living polymerization. Preferred techniques associated with this type of polymerization include, but are not limited to, atom transfer radical polymerization (ATRP), reversible addition fragmentation chain transfer (RAFT) polymerization, and stable free radical polymerization (SFRP) which includes nitroxide-mediated polymerization (NMP). Additional techniques of free radical living polymerization include, but are not limited to, catalytic chain transfer polymerization, iniferter polymerization, iodine-transfer polymerization, selenium-centered radical mediated polymerization, telluride-mediated polymerization, and stibine-mediated polymerization for example. An informative overview of free radical living polymerization is provided in Braunecker et al., "Controlled/Living Radical Polymerization: Features, Developments, and Perspectives," *Progress in Polymer Science, Vol.* 33, Issue 1, p. 165 (2008).

Atom transfer radical polymerization (ATRP) forms carbon-carbon bonds through a transition metal catalyst. As the name implies, the atom transfer step is the key step in the reaction responsible for uniform polymer chain growth.

The uniformed polymer chain growth, which leads to low polydispersity, stems from the transition metal-based catalyst. This catalyst provides an equilibrium between an active, and therefore propagating, form of the polymer and an inactive form of the polymer, known as the dormant form. Since the dormant state of the polymer is vastly preferred in this equilibrium, side reactions are suppressed.

This equilibrium in turn lowers the concentration of propagating radicals, therefore suppressing unintentional termination and controlling molecular weights.

ATRP reactions are very robust in that they are tolerant of many functional groups like allyl, amino, epoxy, hydroxy and vinyl groups which can be present in either the monomer or the initiator. ATRP methods are also advantageous due to the ease of preparation, commercially available and inexpensive catalysts (such as copper complexes for example), and pyridine based ligands and initiators (such as for example alkyl halides).

Generally, there are several significant variable components of atom transfer radical polymerizations. These variable factors relate to the monomer, initiator, catalyst, solvent and temperature, and are addressed as follows.

Monomers that are typically used in ATRP include molecules with substituents that can stabilize the propagating radicals; for example, styrenes, (meth)acrylates, (meth)acrylamides, and acrylonitrile. ATRP methods are successful at leading to polymers of high number average molecular weight and a narrow polydispersity index when the concentration of the propagating radical balances the rate of radical termination. Yet, the propagating rate is unique to each individual monomer. Therefore, it is important that the other components of the polymerization (such as for example initiator, catalysts, ligands and solvents) are optimized in order for the concentration of the dormant species to be greater than the concentration of the propagating radical and yet not too great to slow down or halt the reaction.

The number of growing polymer chains is determined by the initiator. The faster the initiation, the fewer terminations and transfers, the more consistent the number of propagating chains leading to narrow molecular weight distributions. Organic halides that are similar in the organic framework as the propagating radical are often chosen as initiators. Alkyl halides such as alkyl bromides are more reactive than alkyl chlorides and both have good molecular weight control.

The catalyst is the most important component of ATRP because it determines the equilibrium constant between the active and dormant species. This equilibrium determines the polymerization rate and an equilibrium constant too small may inhibit or slow the polymerization while an equilibrium constant too large leads to a high distribution of chain lengths. There are several requirements for the metal catalyst: (i) there needs to be two accessible oxidation states that are separated by one electron, (ii) the metal center needs to have a reasonable affinity for halogens, (iii) the coordination sphere of the metal needs to be expandable when it's oxidized in order to accommodate the halogen, and (iv) a strong ligand complexation. The most studied catalysts are those used in polymerizations involving copper, which has shown to have the most versatility, evidenced by successful polymerizations regardless of the monomer.

Solvents typically include toluene, 1,4-dioxane, for example.

ATRP processes can be conducted in a relatively wide range of temperatures.

Additional information relating to ATRP methods is provided in Wang, J., Matyjaszewski, K., "Controlled/"living" Radical Polymerization. Atom Transfer Radical Polymerization in the Presence of Transition-Metal Complexes", *J. Am. Chem. Soc,* 117: 5614-5615 (1995); Cowie, J. M. G., Arrighi, V., *Polymers: Chemistry and Physics of Modern Materials*, CRC Press Taylor and Francis Group: Boca Raton, Fla., 2008, 3rd Ed., pp 82-84; Patten, T. E., Matyjaszewski, K., "Atom Transfer Radical Polymerization and the Synthesis of Polymeric Materials", *Adv. Mater.,* 10: 901 (1998); Odian, G., *Radical Chain Polymerization; Principles of Polymerization*, Wiley-Interscience: Staten Island, N.Y., 2004, pp 316-321; and Matyjaszewski, K., Xia, J., "Atom Transfer Radical Polymerization", *Chem. Rev.,* 101 (9): 2921-2990 (2001).

Reversible addition fragmentation chain transfer (RAFT) polymerization offers the benefit of being able to readily synthesize polymers with predetermined molecular weight and narrow molecular weight distributions over a wide range of monomers with reactive terminal groups that can be purposely manipulated, including further polymerization, with complex architecture. Furthermore, RAFT can be used in all modes of free radical polymerization: solution, emulsion and suspension polymerizations. Implementing the RAFT technique can be as simple as introducing a suitable chain transfer agent (CTA), known as a RAFT agent, into a conventional free radical polymerization reaction, which should be devoid of oxygen, which terminates propagation. This CTA is the main species in RAFT polymerization. Generally the CTA is a di- or tri-thiocarbonylthio compound, which produces the dormant form of the radical chains. A preferred RAFT agent is dibenzyl trithiocarbonate (DBTTC). Control in RAFT polymerization is achieved in a far more complicated manner than the homolytic bond formation-bond cleavage of stable free radical polymerization and atom transfer radical polymerization. The CTA for RAFT polymerization must cautiously be chosen because it has an effect on polymer length, chemical composition, rate of the reaction and the number of side reactions that may occur.

The mechanism of RAFT begins with a standard initiation step as homolytic bond cleavage of the initiator molecule and yields a reactive free radical. This free radical then reacts with a molecule of the monomer to form the active center with additional molecules of monomer then adding in a sequential fashion to produce a growing polymer chain. The propagating chain adds to the CTA to yield a radical intermediate. Fragmentation of this intermediate gives rise to either the original polymer chain or to a new radical, which itself must be able to re-initiate polymerization. This free radical generates its own active center by reaction with the monomer and eventually a new propagating chain is formed. Ultimately, chain equilibration occurs in which there is a rapid equilibrium between the actively growing radicals and the dormant compounds, thereby allowing all of the chains to grow at the same rate. A limited amount of termination typically occurs. However, the effect of termination on polymerization kinetics is negligible.

The calculation of molecular weight for a synthesized polymer is relatively straight forward, in spite of the complex mechanism for RAFT polymerization. As previously noted, during the equilibration step, all chains are growing at equal rates, or in other words, the molecular weight of the polymer increases linearly with conversion. Multiplying the ratio of monomer consumed to the concentration of the CTA used by the molecular weight of the monomer, a reliable estimate of the number average molecular weight can be determined.

RAFT is a degenerative chain transfer process and is free radical in nature. RAFT agents contain di- or tri-thiocarbonyl groups, and it is the reaction with an initiator, usually AIBN, that creates a propagating chain or polymer radical. This polymer chain then adds to the C=S and leads to the formation of a stabilized radical intermediate. In an ideal system, these stabilized radical intermediates do not undergo termination reactions, but instead re-introduce a radical capable of re-initiation or propagation with monomer, while they themselves reform their C=S bond. The cycle of addition to the C=S bond, followed by fragmentation of a radical, continues until all monomer or initiator is consumed. Termination is limited in this system by the low concentration of active radicals and any termination that does occur is negligible.

Trithiocarbonate type RAFT agents are commercially available. These agents are typically low in color and are typically yellow to off-white. These agents also exhibit a low odor. Trithiocarbonate RAFT agents are highly effective with acrylates, styrenics, and methacrylates. These agents enable an "inside-out" growth of the polymer species of interest during formation. The use of these agents enable the formation of symmetrical tri-block versions in two steps.

A representative reaction scheme is depicted below as scheme (A) in which dibenzyl trithiocarbonate (DBTTC) is used as a chain transfer or RAFT agent after monomer addition:

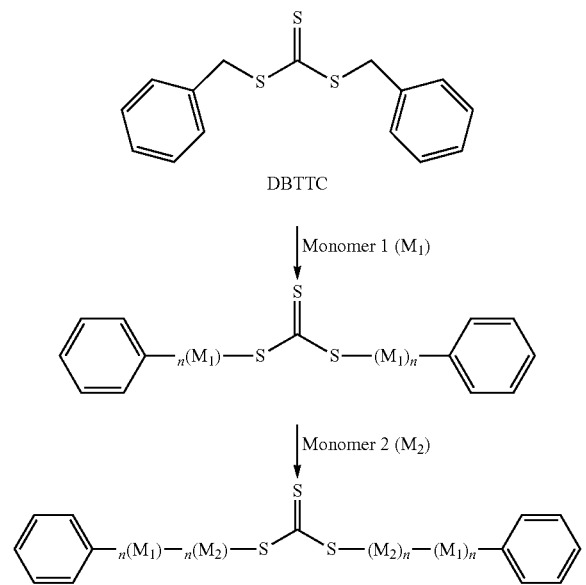

Additional information pertaining to RAFT processes is provided in Chiefari et al., "Living Free-Radical Polymerization by Reversible Addition-Fragmentation Chain Transfer: The RAFT Process," *Macromolecules,* 31 (16), p. 5559-5562, (1998); Moad et al., "Living Free Radical Polymerization With Reversible Addition-Fragmentation Chain Transfer," *Macromolecules* 1999 Conference: Polymers in the New Millennium, Bath, UK, Sep. 5-9, 1999; and Mayadunne et al., "Living Radical Polymerization with Reversible Addition-Fragmentation Chain Transfer (RAFT Polymerization) Using Dithiocarbamates as Chain Transfer Agents," *Macromolecules,* 32 (21), p. 6977-6980, (1999).

Stable free radical polymerization (SFRP) is a process-oriented technology that facilitates the preparation of linear or branched polymers having narrow molecular weight distributions and reactive end groups on each polymer chain. The process can also produce block copolymers having unique properties. Process conditions allow high (essentially 100%) conversions at reasonable process temperatures (less than 130° C.). The process is especially applicable to acrylates, styrenes, and dienes. Furthermore, nitroxide-based stable free radical polymerization is particularly suited for emulsion or miscrosuspension polymerization. Additional information relating to SFRP techniques is provided in Matyjaszewski et al., "Simple and Efficient Synthesis of Various Alkoxyamines for Stable Free Radical Polymerization," *Macromolecules,* 31 (17), p. 5955-5957, (1998).

Depending upon the polymerization technique, the polymerization catalyst can be, for example, organic tin compounds, metal complexes, amine compounds and other basic compounds, organic phosphate compounds, and organic acids. Examples of the organic tin compounds include dibutyltin dilaurate, dibutyltin maleate, dibutyltin phthalate, stannous octoate, dibutyltin methoxide, dibutyltin diacetylacetate and dibutyltin diversatate. Examples of metal complexes are titanate compounds such as tetrabutyl titanate, tetraisopropyl titanate, and tetraethanolamine titanate; metal salts of carboxylic acids, such as lead octoate, lead naphthoate, and cobalt naphthoate; and metal acetylacetonate complexes such as aluminum acetylacetonate complex and vanadium acetylacetonate complex. The amine compounds and other basic compounds include, for example aminisilanes such as γ-aminopropyl trimethoxysilane and γ-aminopropyltriethoxysilane; quaternary ammonium salts such as tetramethylammonium chloride and benzalkonium chloride; and straight-chain or cyclic tertiary amines or quaternary ammonium salts each containing plural nitrogen atoms. The organic phosphate compounds include monomethyl phosphate, di-n-butyl phosphate and triphenyl phosphate. Examples of organic acid catalysts include alkyl sulfonic acids such as methane sulfonic acid, aryl sulfonic acids such as p-toluene sulfonic acid, benzene sulfonic acid, styrene sulfonic acid and the like.

Adhesive Compositions

As noted, the ordered polymers described herein find particular application in pressure sensitive adhesive compositions. Preferably, the polymers are acrylic polymers having one or more reactive functional groups incorporated and apportioned in the polymer as described herein.

The adhesive composition may also include a tackifier. Tackifiers are generally hydrocarbon resins, wood resins, rosins, rosin derivatives, and the like. It is contemplated that any tackifier known by those of skill in the art to be compatible with elastomeric polymer compositions may be used with the present embodiment of the invention. One such tackifier found to be useful, is a synthetic polyterpene resin that is liquid at room temperature. This resin is a synthetic tackifier resin that predominantly comprises a polymer derived from piperylene and isoprene. Other suitable tackifying additives may include an aliphatic hydrocarbon resin, and a $C_5$-$C_9$ (including for example an aromatic modified aliphatic) resin. Of course, as can be appreciated by those skilled in the art, a variety of different tackifying additives may be used in accordance with the present invention.

In addition to the tackifiers, other additions may be included in the adhesives to impart desired properties. For example, plasticizers may be included and they are known to decrease the glass transition temperature of an adhesive composition containing elastomeric polymers.

Antioxidants also may be included in the adhesive compositions. Suitable antioxidants include, but are not limited to, Irgafos 168 and Irganox 565 available from Ciba-Geigy, Hawthorne, N.Y.

Other optional materials which may be added to the adhesive composition in minor amounts, i.e. typically less than about 25% by weight of the elastomeric phase, include pH controllers, medicaments, bactericides, growth factors, wound healing components such as collagen, deodorants, perfumes, antimicrobials and fungicides. Cutting agents such as waxes and surfactants may also be included in the adhesives.

The adhesive may be crosslinked during post curing of the adhesive to increase the cohesive strength of the pressure sensitive adhesive. This can be achieved via covalent cross-linking such as by using heat, actinic or electron beam radiation, or metal based ionic crosslinking between functional groups. The crosslinking agent is typically used at a level from about 0.05% to about 5%, or from about 0.075% to about 2%, or from about 0.1% to about 1.5% by weight of adhesive solids. A preferred crosslinking agent is aluminum acetyl acetonoate.

The adhesives of the present invention may further comprise additives such as pigments, fillers, diluents, and the like. Pigment, if desired, is provided in an amount sufficient to impart the desired color to the adhesive. Examples of pigments include, without limitation, solid inorganic fillers such as carbon black, titanium dioxide and the like, and organic dyes. Additional inorganic fillers such as aluminum trihydrate, christobalite, glass fibers, kaolin, precipitated or fumed silica, copper, quartz, wollasonite, mica, magnesium hydroxide, silicates (e.g. feldspar), talc, nickel and calcium carbonate are also useful. Metal oxides such as aluminum trihydrate and magnesium hydroxide are particularly useful as flame retardants.

Additional details of adhesives, related adhesive formulations, additives, uses, and applications are set forth in US published patent applications 2009/0130363 and 2004/0266965; and U.S. Pat. Nos. 7,459,193; 7,019,067; 6,953,602; 6,844,391; and 6,780,231.

EXAMPLES

Example 1

Preparation of Preferred Embodiment Segmented Acrylic Polymer Having Staged Acrylic Acid Functionality Using RAFT Agent An acrylic copolymer with reactive functional groups positioned throughout the polymer chain, but with a higher concentration of functionality in the end regions of the polymer, was prepared as follows. Into a 500 ml reactor equipped with a heating jacket, agitator, reflux condenser, feed tanks and nitrogen gas inlet, there was charged 52.1 g of butyl acetate. Monomers and RAFT agent were added in the following amounts to generate the end segment:

16.0 g 2-ethylhexyl acrylate
14.0 g butyl acrylate
6.0 g acrylic acid
0.30 g of dibenzyl trithiocarbonate (RAFT agent)

The reactor charge was heated to 75° C. with a constant nitrogen purge. Once solvent reflux was attained, an initiator solution of 0.05 g 2,2'-azo-bis(isobutyronitrile) (AIBN, Vazo-64) and 1.50 g ethyl acetate was added to the reactor. After a peak temperature range of 80-85° C. was attained, the reaction conditions were maintained for 60 minutes at which point more than 80% of the monomers were consumed to generate reactive segments yielding a theoretical $M_n$ of 10,000-15,000 g/mole. After the 60 minute hold, a reagent feed mixture with an active nitrogen purge of 83.92 g ethyl acetate, 143.4 g 2-ethylhexyl acrylate, 126.5 g butyl acrylate, 6.0 g acrylic acid, and 0.05 g Vazo-64 was added over a period of two and one half hours to the reactor. During the reagent feed, the temperature of the reaction was allowed to increase from 76-78° C. up to 84-88° C. The reaction conditions were maintained for 30 minutes after completion of the reagent feed at which point more than 85.0% of the monomers were consumed. A finishing solution was fed into the kettle consisting of 0.25 g tert amyl peroxypivalate, and 26.2 g of ethyl acetate to consume all remaining monomers to yield a second reactive segment with a theoretical $M_n$ of approximately 270,000 g/mole. The resulting solution polymer was then cooled to ambient temperature and discharged from the reactor.

The resulting acrylic copolymer contained 51.0% 2-ethylhexyl acrylate, 45.0% butyl acrylate, and 4.00% acrylic acid based on 100% by weight of the acrylic copolymer. This polymer had the acrylic acid split at a ratio of 50:50 between the end regions and inner region. The apportionment ratio of the polymer was 7.68:1.

The physical properties of the resulting polymer were as follows:

Total solids content—58.5%
Viscosity—5800 centipoise Spindle #5 @50 RPMs Brookfield RVT
Total residual monomers—less than 2.0%

The resultant solution polymer was crosslinked at 0.75% based on total solid content with aluminum acetyl acetonoate (1:3:9 aluminum:2,4-pentanedione:toluene). The adhesive composition was dried at room temperature for 10 minutes, then placed in an oven for 10 minutes at 140° C.

The following test methods were used for evaluating the adhesive properties of the adhesives.

TABLE 2

| PSA Performance Test Methods | |
| --- | --- |
| Test | Condition |
| 180° Peel | a, b, c |
| 15 Minute Dwell | |
| 24 Hour Dwell | |
| 72 Hour Dwell | |
| Shear Strength | d | a Peel, sample applied to a stainless steel panel with a 5 pound roller with 1 pass in each direction. Samples conditioned and tested at 23° C.
b Peel, sample applied to a high density polyethylene panel with a 5 pound roller with 5 passes in each direction. Samples conditioned and tested at 23° C.
c Peel, sample applied to a polypropylene panel with a 5 pound roller with 5 passes in each direction. Samples conditioned and tested at 23° C.
d Shear: 2 kg weight with a ½ inch by 1 inch overlap. Sample applied to a stainless steel panel with a 10 pound roller with 5 passes in each direction. Samples conditioned and tested at 23° C.

The adhesive of Example 1 was coated onto 2-mil polyethylene terephthalate at 58-62 grams per square meter (gsm) and dried at 140° C. for 10 minutes.

TABLE 3

Test Results

| Test | Example 1 | Commercial Control |
|---|---|---|
| (a) 180 peel to stainless steel 15 minutes dwell (lb/in) | 3.3 | 3.5 |
| (a) 180 peel to stainless steel 24 hours dwell (lb/in) | 5.1 | 5.0 |
| (a) 180 peel to stainless steel 96 hours dwell (lb/in) | 5.3 | 5.5 |
| (b) 180 peel to high density polypropylene 96 hours dwell (lb/in) | 2.25 | 1.1 zip |
| (d) Static Shear ½ × 1 × 2 kg stainless (minutes) | 1000-1500 minutes | 40-60 minutes |

Example 2

Preparation of Preferred Embodiment Segmented Acrylic Polymer Having Staged Acrylic Acid Functionality Using RAFT Agent An acrylic copolymer with reactive functional groups positioned throughout the polymer chain, but with a higher concentration of functionality in the end regions, was prepared as follows. Into a 1500 ml reactor equipped with a heating jacket, agitator, reflux condenser, feed tanks and nitrogen gas inlet, there was charged 86.98 g of ethyl acetate. Monomers and RAFT agent were added in the following amounts to generate the end segment:

48.33 g 2-ethylhexyl acrylate
18.86 g acrylic acid
6.48 g isobornyl acrylate
2.95 g nn-dimethyl acrylamide
0.57 g of dibenzyl trithiocarbonate (RAFT agent)

The reactor charge was heated to reflux conditions (reactor jacket 90° C.) with a constant nitrogen purge. Once solvent reflux was attained, an initiator solution of 0.06 g 2,2'-azo-bis(isobutyronitrile) (AIBN, Vazo-64) and 5.00 g ethyl acetate was added to the reactor. After a peak temperature range of 80-85° C. was attained, the reaction conditions were maintained for 60 minutes at which point more than 70% of the monomers were consumed to generate reactive segments yielding a theoretical $M_n$ of approximately 13,000 g/mole each. A reagent feed mixture with an active nitrogen purge of 255.28 g ethyl acetate, 434.99 g 2-ethylhexyl acrylate, 58.35 g isobornyl acrylate, 26.52 g nn-dimethyl acrylamide, 4.72 g acrylic acid, and 0.06 g Vazo-64 was added over a period of two and one half hours to the reactor. During the reagent feed, the temperature of the reaction was held at 82-86° C. The reaction conditions were maintained for 30 minutes after completion of the reagent feed at which point more than 80.0% of the monomers were consumed. A finishing solution was fed into the kettle consisting of 0.32 g tert amyl peroxypivalate, and 50.52 g of ethyl acetate to consume all remaining monomers to yield a second reactive segment with a theoretical $M_n$ of approximately 270,000 g/mole. The resulting solution polymer was then cooled to ambient temperature and discharged from the reactor.

The resulting acrylic copolymer contained 80.40% 2-ethylhexyl acrylate, 10.78% isobornyl acrylate, 4.90% nn-dimethyl acrylamide, and 3.92% acrylic acid based on 100% by weight of the acrylic copolymer. This polymer had the acrylic acid split at a ratio of 80:20 between the outer and inner segments. The theoretical molecular weight (Mn) of the acrylic copolymer was 86,112 g/mol, the measured molecular weight (Mw) of the acrylic copolymer was 231,210 g/mol (determined by gel permeation chromatography relative to polystyrene standards) and the polydispersity was 2.685. The apportionment ratio of this polymer is 27.34:1.

The physical properties of the resulting polymer were as follows:

Total solids content—62.73% 40 min @135° C.
Viscosity—27,600 centipoise Spindle #4 @5 RPMs Brookfield RVT
Residual 2-Ethylhexyl Acrylate—1.63%=96.63% converted The resulting solution polymer was crosslinked at 0.75% based on total solid content with aluminum acetyl acetonoate (1:3:9 aluminum:2,4-pentanedione:toluene). The adhesive composition was dried at room temperature for 10 minutes, then placed in an oven for 10 minutes at 140° C.

The adhesive composition was then subjected to the PSA performance test methods described in Example 1 and noted in Table 2.

The adhesive of Example 2 was coated onto 2-mil polyethylene terephthalate at 58-62 grams per square meter (gsm) and dried at 140° C. for 10 minutes.

TABLE 4

Test Results

| Test | Example 2 |
|---|---|
| (a) 180 peel to stainless steel 15 minutes dwell (lb/in) | 4.29 |
| (a) 180 peel to stainless steel 24 hours dwell (lb/in) | 5.17 |
| (a) 180 peel to stainless steel 96 hours dwell (lb/in) | 6.28 |
| (b) 180 peel to high density polyethylene 96 hours dwell (lb/in) | 1.23 |
| (c) 180 peel to polypropylene 96 hours dwell (lb/in) | 3.33 |
| (d) Static Shear ½ × 1 × 1 kg stainless (minutes) | 6313.13 2 - Pop, 1 - removed |

Example 3

Preparation of Preferred Embodiment Segmented Acrylic Polymer Having Staged Acrylic Acid Functionality Using RAFT Agent An acrylic copolymer with reactive functionalities positioned throughout the polymer chain, but with a higher concentration of functionality in the outer segments, was prepared as follows. Into a 1500 ml reactor equipped with a heating jacket, agitator, reflux condenser, feed tanks and nitrogen gas inlet there was charged 57.41 g of butyl acetate and 16.62 g methanol. Monomers and RAFT agent were added in the following amounts to generate the end segment:

33.39 g 2-ethylhexyl acrylate
17.53 g methyl acrylate
12.69 g acrylic acid
1.03 g of dibenzyl trithiocarbonate (RAFT agent)

The reactor charge was heated to 76.0° C. with a constant nitrogen purge. Once solvent reflux was attained, an initiator solution of 0.073 g 2,2'-azo-bis(isobutyronitrile) (AIBN, Vazo-64) and 1.50 g butyl acetate was added to the reactor. After a peak temperature range of 78-82° C. was attained, a reagent feed mixture with an active nitrogen purge of 60.44 g ethyl acetate, 19.64 g methanol, 33.24 g 2-ethylhexyl acrylate, 17.38 g methyl acrylate, 12.69 g acrylic acid, and 0.073 g Vazo-64 was added over a period of 20 minutes. After the reagent feed mixture was added, the reaction conditions were maintained for 18 minutes at which point 0.07 g of Vazo 64 and 1.5 g ethyl acetate were added to the reactor. Reaction conditions were maintained for 2 minutes after which, more than 80% of the acrylic acid and more than 50% of the 2-ethylhexyl acrylate were consumed to generate reactive segments yielding a theoretical $M_n$ of 15,000-20,000 g/mole. After the 2 minute hold, a second reagent feed mixture with an active nitrogen purge of 317.29 g ethyl acetate, 599.67 g 2-ethylhexyl acrylate, 314.11 g methyl acrylate, 6.04 g acrylic acid, and 0.145 g Vazo-64 was added over a period of two hours and 40 minutes to the reactor. During the reagent feed, the temperature of the reaction was allowed to increase from 76-78° C. up to 82-84° C. The reaction conditions were maintained for 20 minutes after completion of the reagent feed at which point 0.03 g Vazo 64 and 2.92 g ethyl acetate were added to the reactor. This process was repeated two more times for a total of three 20 minute holds, and three Vazo 64/ethyl acetate additions. After the third addition, reaction conditions were maintained for 30 minutes at which time more than 95% of the monomers were consumed. A finishing solution was fed into the kettle consisting of 1.03 g tert amyl peroxypivalate (75%), and 93.67 g of toluene to consume all remaining monomers to yield a second reactive segment with a theoretical $M_n$ of approximately 260,000 g/mole. The resulting solution polymer was then cooled to ambient temperature, and a dilution charge of 45.33 g isopropyl alcohol and 81.59 g toluene were added to the reactor. After mixing, the solution was discharged.

The resulting acrylic copolymer contained 63.65% 2-ethylhexyl acrylate, 33.35% methyl acrylate, 3.00% acrylic acid based on 100% by weight of the acrylic copolymer. This polymer had the acrylic acid split at a ratio of 80:20 between the outer and inner segments. The apportionment ratio of this polymer is 30.3:1.

The physical properties of the resulting polymer were as follows:
  Total solids content—59%
  Viscosity—20000 centipoise Spindle #5 @10 RPMs Brookfield RVT
  Total residual monomers—less than 2.0%

The resultant solution polymer was crosslinked at 0.55% based on total solid content with aluminum acetyl acetonoate (1:3:9 aluminum:2,4-pentanedione:toluene). The adhesive composition was dried at room temperature for 10 minutes, then placed in an oven for 10 minutes at 140° C.

The adhesive composition was then subjected to the PSA performance test methods described in Example 1 and noted in Table 2.

The adhesive was coated onto 2-mil polyethylene terephthalate at 58-62 grams per square meter (gsm) and dried at 140° C. for 10 minutes.

TABLE 5

Test Results

| Test | Example 1 | Commercial Control |
|---|---|---|
| (a) 180 peel to stainless steel 15 minutes dwell (lb/in) | 4.01 | 3.90 |
| (a) 180 peel to stainless steel 24 hours dwell (lb/in) | 4.53 | 4.40 |
| (a) 180 peel to stainless steel 72 hours dwell (lb/in) | 5.01 | NA |
| (b) 180 peel to high density polypropylene 96 hours dwell (lb/in) | 1.68 ZIP | NA |
| (d) Static Shear ½ × 1 × 2 kg stainless (min.) | 10000 minutes | 4100 minutes |

Example 4

Preparation of Preferred Embodiment Segmented Acrylic Polymer Having Staged Acrylic Acid Functionality Using RAFT Agent An acrylic copolymer with reactive functionalities positioned throughout the polymer chain, but with a higher concentration of functionality in the outer segments, was prepared as follows. Into a 1500 ml reactor equipped with a heating jacket, agitator, reflux condenser, feed tanks and nitrogen gas inlet there was charged 173.79 g of ethyl acetate. Monomers and RAFT agent were added in the following amounts to generate the end segment:
  70.80 g 2-ethylhexyl acrylate
  62.47 g butyl acrylate
  36.14 g acrylic acid
  2.18 g of dibenzyl trithiocarbonate (RAFT agent)

The reactor charge was heated to 76.0° C. with a constant nitrogen purge. Once solvent reflux was attained, an initiator solution of 0.12 g 2,2'-azo-bis(isobutyronitrile) (AIBN, Vazo-64) and 5.00 g ethyl acetate was added to the reactor. After a peak temperature range of 80-85° C. was attained, the reaction conditions were maintained for 30 minutes at which point more than 80% of the monomers were consumed to generate reactive segments yielding a theoretical $M_n$ of 10,000–4500 g/mole. After the 30 minute hold, a reagent feed mixture with an active nitrogen purge of 201.39 g ethyl acetate, 505.23 g 2-ethylhexyl acrylate, 445.71 g butyl acrylate, 9.04 g acrylic acid, and 0.12 g Vazo-64 was added over a period of two and one half hours to the reactor. During the reagent feed, the temperature of the reaction was allowed to increase from 76-78° C. up to 84-88° C. After the reagent feed was completed, the reaction was held for 20 minutes. After the 20 minute hold, 0.026 g of Vazo-64 and 2.00 grams of ethyl acetate were added to the reactor. This was repeated two more times. After the third Vazo-64 add, the reaction was held 30 minutes at which point more than 85.0% of the monomers were consumed. A finishing solution was fed into the kettle consisting of 0.93 g tert amyl peroxypivalate, and 95.42 g of ethyl acetate to consume all remaining monomers to yield a second reactive segment with a theoretical $M_n$ of approximately 150,000 g/mole. The resulting solution polymer was then cooled to ambient temperature and discharged from the reactor.

The resulting acrylic copolymer contained 51.0% 2-ethylhexyl acrylate, 45.0% butyl acrylate, 4.00% acrylic acid based on 100% by weight of the acrylic copolymer. This polymer had the acrylic acid split at a ratio of 80:20 between the outer and inner segments. The apportionment ratio of this polymer is 22.69:1.

The physical properties of the resulting polymer were as follows:
  Total solids content—67.70%
  Viscosity—53000 centipoise Spindle #5 @5 RPMs Brookfield RVT
  Total residual monomers—less than 2.0%

The resultant solution polymer was crosslinked at 0.50% based on total solid content with aluminum acetyl acetonoate (1:3:9 aluminum:2,4-pentanedione:toluene). The adhesive composition was dried at room temperature for 10 minutes, then placed in an oven for 10 minutes at 140° C.

The adhesive composition was then subjected to the PSA performance test methods described in Example 1 and noted in Table 2.

The adhesive was coated onto 2-mil polyethylene terephthalate at 58-62 grams per square meter (gsm) and dried at 140° C. for 10 minutes.

mers were cross-linked using 0.75% by weight (based upon the weight of the polymer) of 1:3:9 aluminum acetylacetonate (AlAcAc).

Samples containing the cross-linked polymers were prepared by direct coating the polymerized and cross-linked material onto Mylar substrates 2 mil in thickness at a coating weight of 60 gsm. The coated samples were air dried for 10 minutes and then oven dried for 10 minutes at 140° C.

The four sets, i.e. sample sets (i)-(iii) and the controls, were then subjected to three 180° peel tests, a static shear test, and a Williams Plasticity test. The results of these tests are set forth below in Table 7.

TABLE 7

| | Test Results | | | |
|---|---|---|---|---|
| Test | 200k g/mole *Control 0.75% AlAcAc | 200k g/mole 80:20 acid 0.75% AlAcAc | 200k g/mole 50:50 acid 0.75% AlAcAc | 200k g/mole 20:80 acid 0.75% AlAcAc |
| 180° Peel to Stainless Steel 15 min Dwell (Lbs/in) | 2.73 | 3.10 | 7.15 Heavy Transfer | 2.00 |
| 180° Peel to Stainless Steel 72 hr Dwell (Lbs/in) | 4.22 | 4.35 | 8.20 Heavy Transfer | 4.34 |
| 180° Peel to Polypropylene 72 hr Dwell (Lbs/in) | 1.48 | 1.66 | 2.49 | 1.45 |
| ½" × 1" × 1 kg minutes (Avg) | 5477.5 Split-Tr. | 10,000+ Removed | 3510.0 Cohesive | 6481.4 Split-Tr |
| Williams Plasticity Index (mm) | 3.10 | 4.42 | 3.25 | 3.00 |

TABLE 6

| | Test Results | |
|---|---|---|
| Test | Example 1 | Random Copolymer Control |
| (a) 180 peel to stainless steel 15 minute dwell (lb/in) | 4.53 | 5.45 TR |
| (a) 180 peel to stainless steel 24 hours dwell (lb/in) | 8.19 SP | 5.26 TR |
| (a) 180 peel to stainless steel 96 hours dwell (lb/in) | 7.97 SP | 5.08 TR |
| (b) 180 peel to high density polypropylene 96 hours dwell (lb/in) | 1.86 | 3.59 Z/TR |
| (d) Static Shear ½ × 1 × 2 kg stainless (min.) | 575 SP | 19.40 SP |

Example 5

Figure 2:
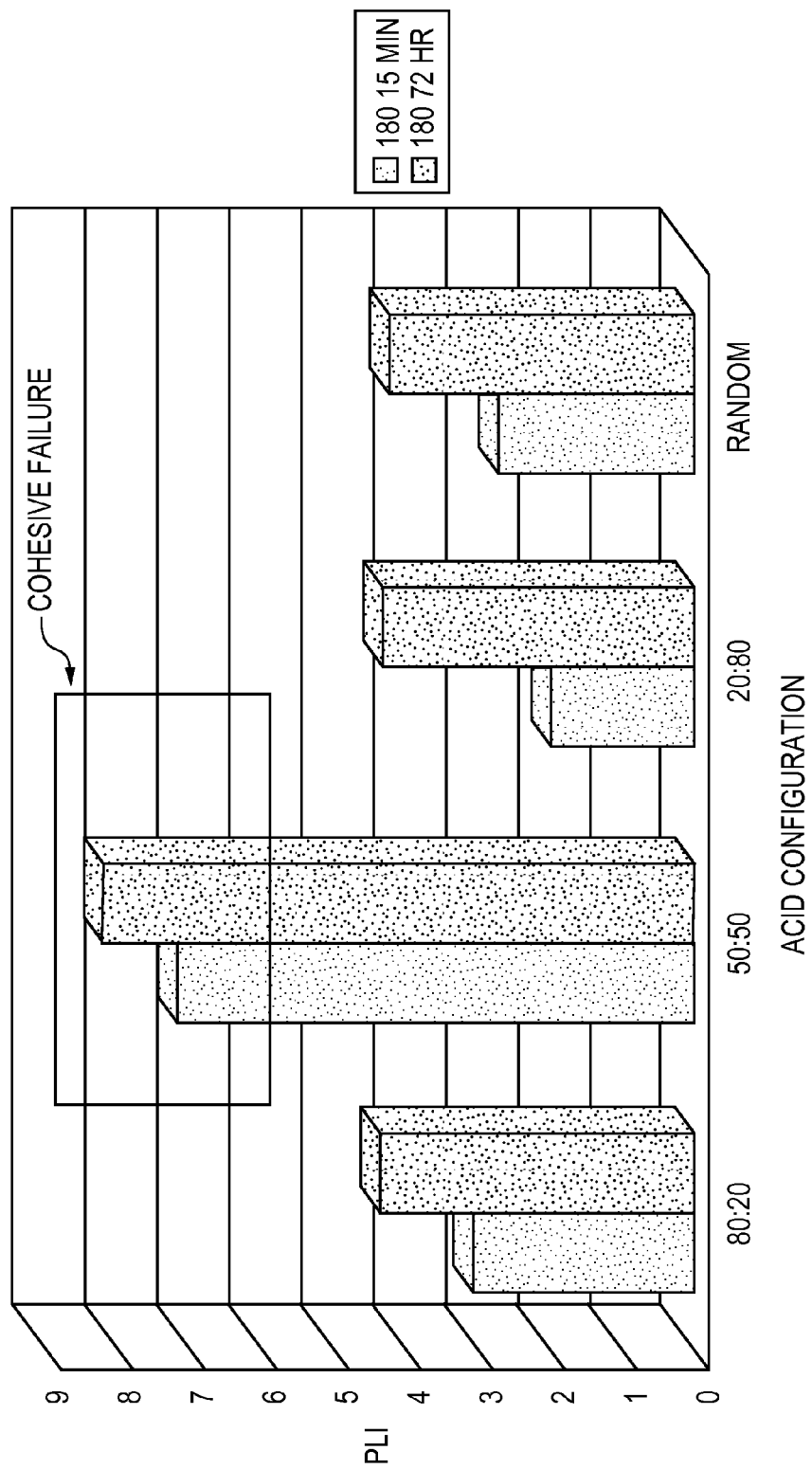
FIG. 2 is a graph of 180° C. peel tests of various samples and a control adhesive using the same extent of cross-linking, but different placement configurations of a reactive functional group.
Figure 3:
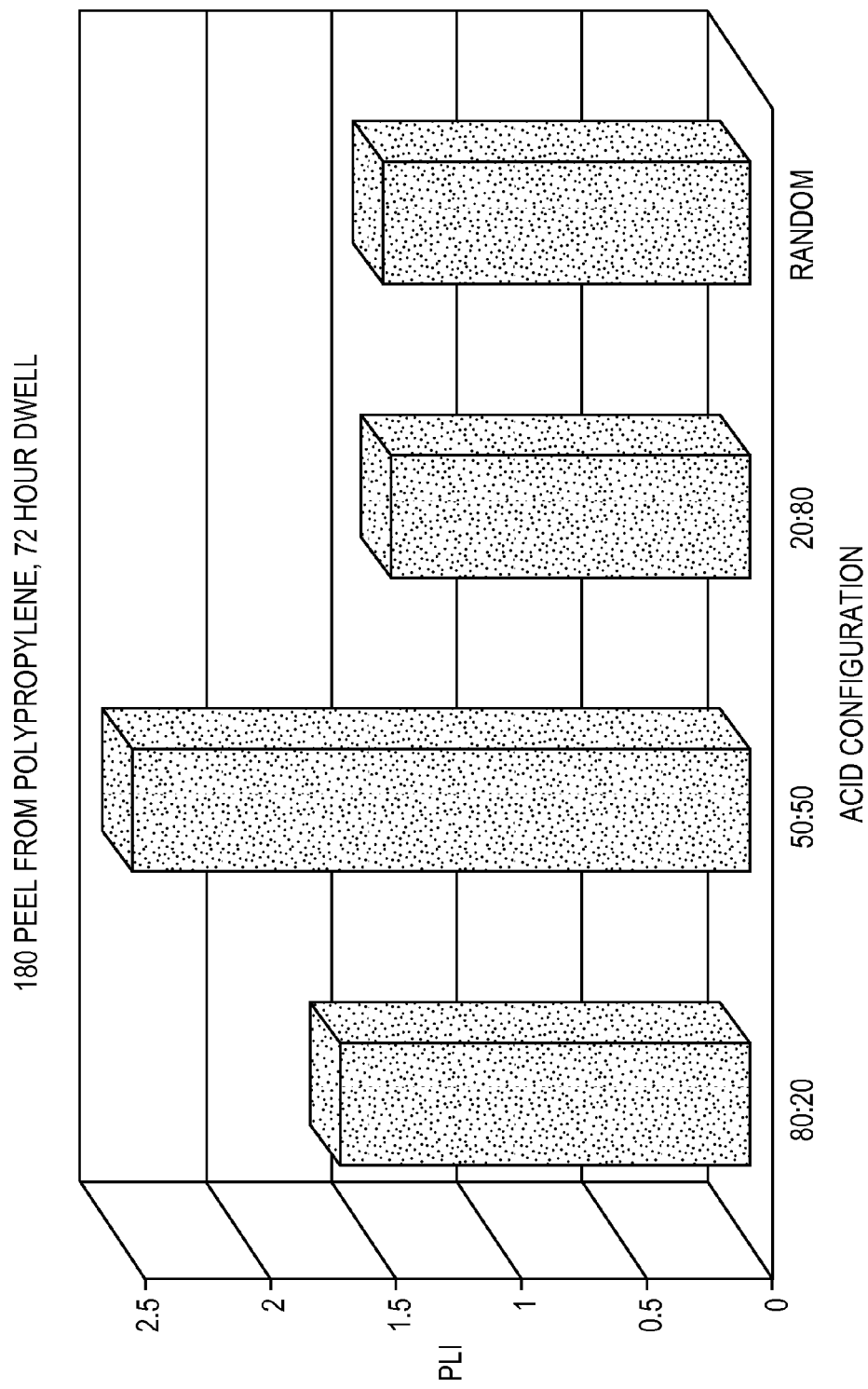
FIG. 3 is a graph of 180° C. peel tests of various samples and a control adhesive using the same extent of cross-linking, but different placement configurations of a reactive functional group.
Figure 4:
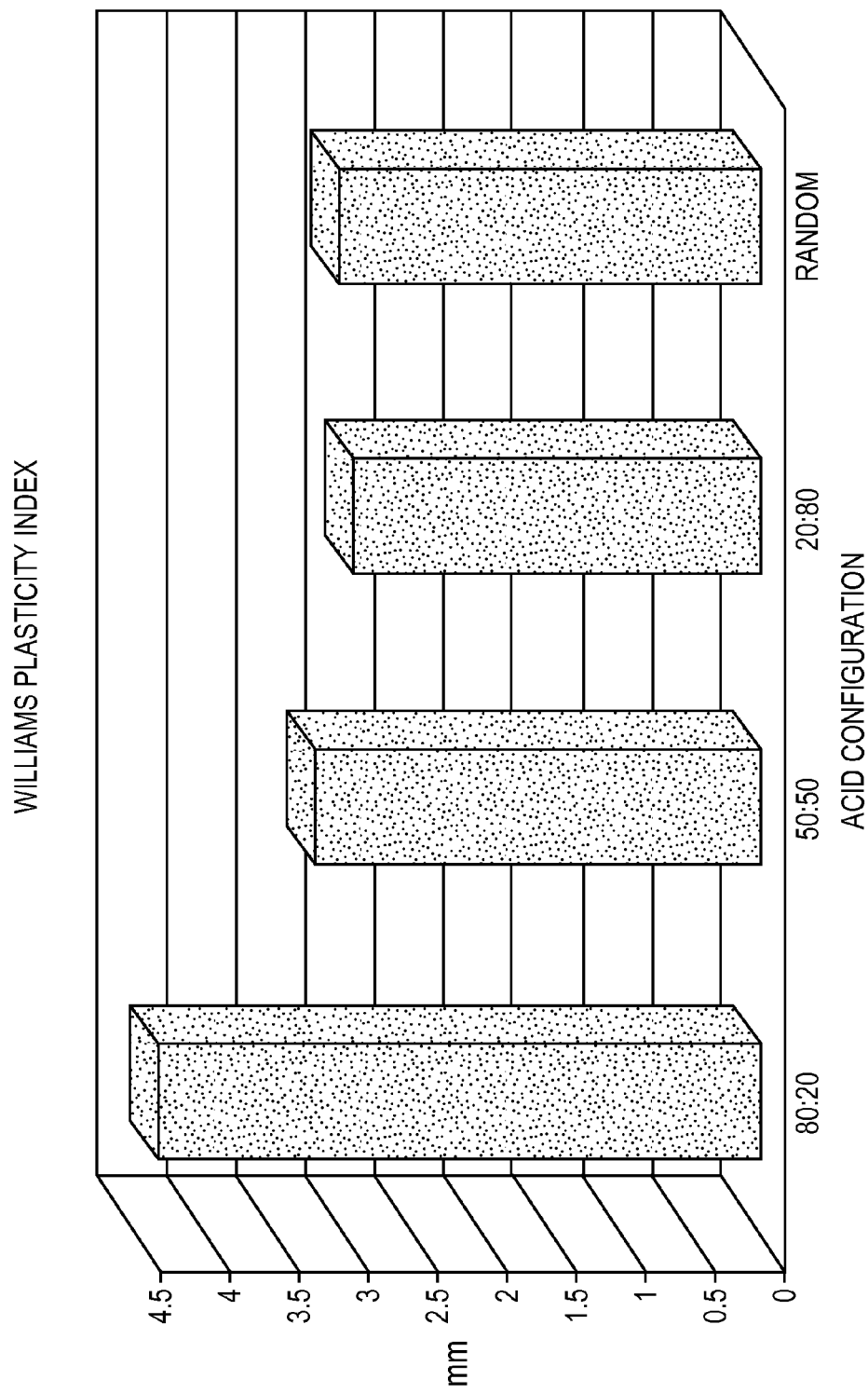
FIG. 4 is a graph of Williams Plasticity Index values of various samples and a control adhesive using the same extent of cross-linking, but different placement configurations of a reactive functional group.
Figure 5:
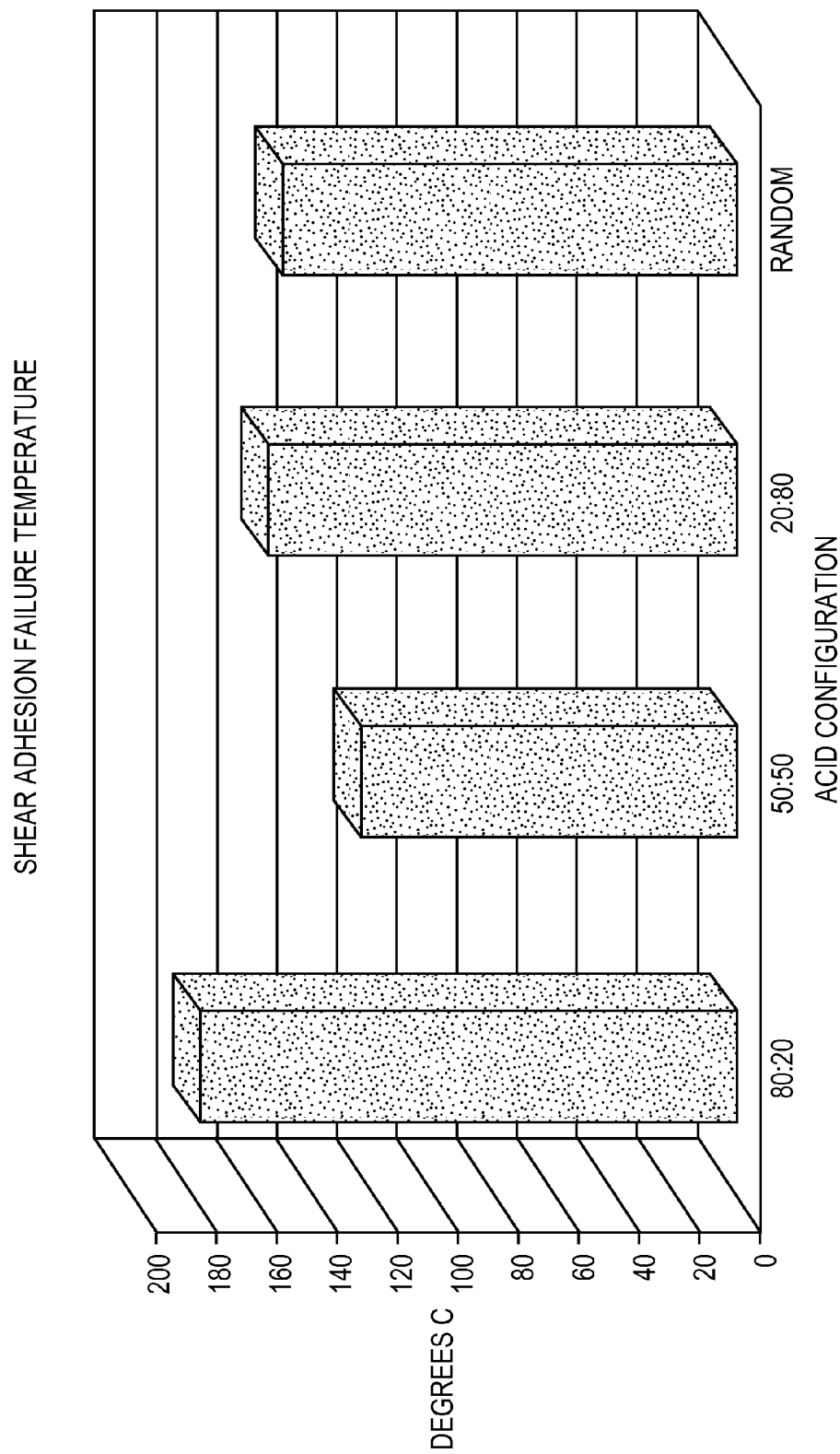
FIG. 5 is a graph of shear adhesion failure temperatures of various samples and a control adhesive using the same extent of cross-linking, but different placement configurations of a reactive functional group.
Figure 6:
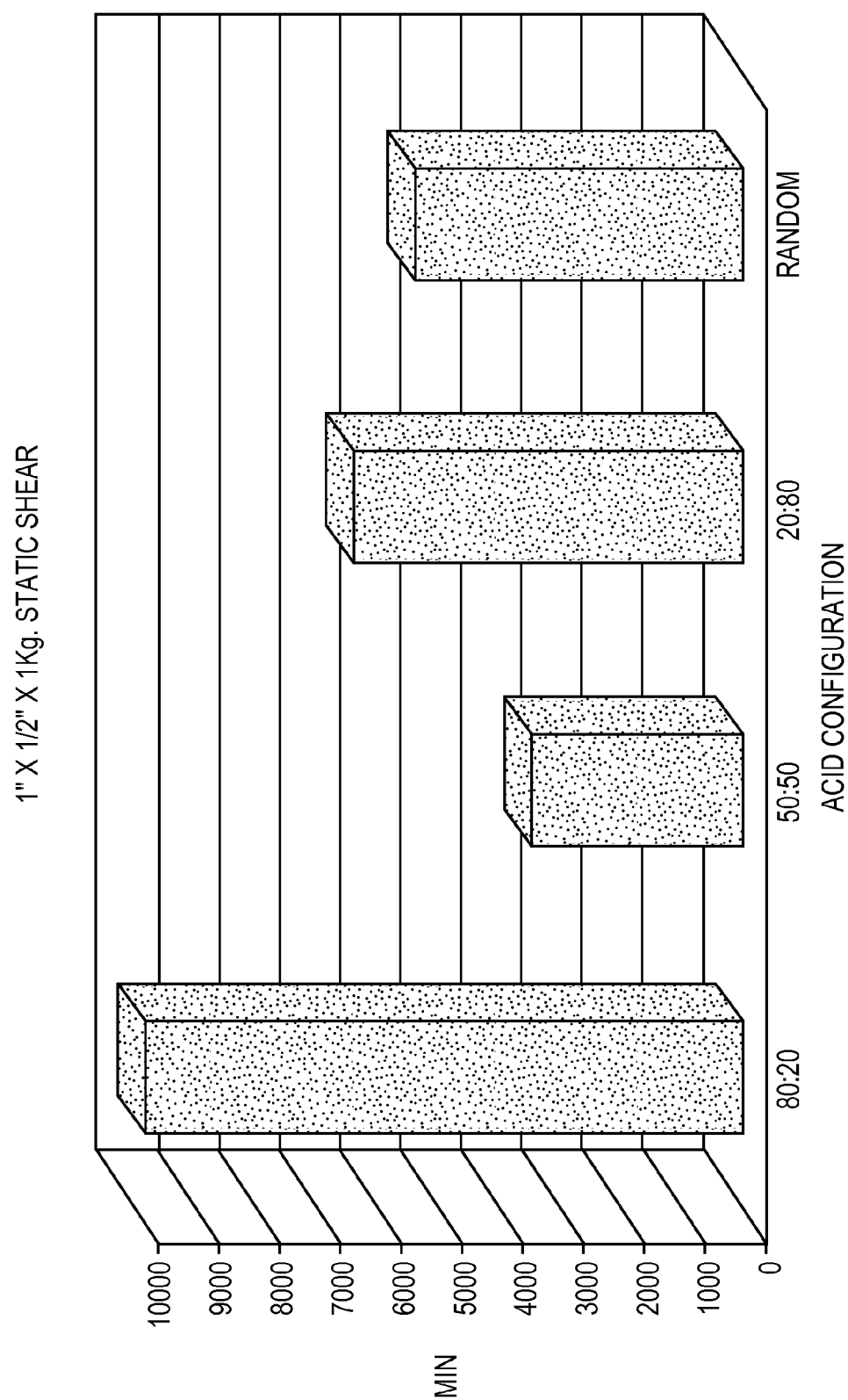
FIG. 6 is a graph of static shear measurements of various samples and a control using the same extent of cross-linking, but different placement configurations of a reactive functional group.
Figure 7:
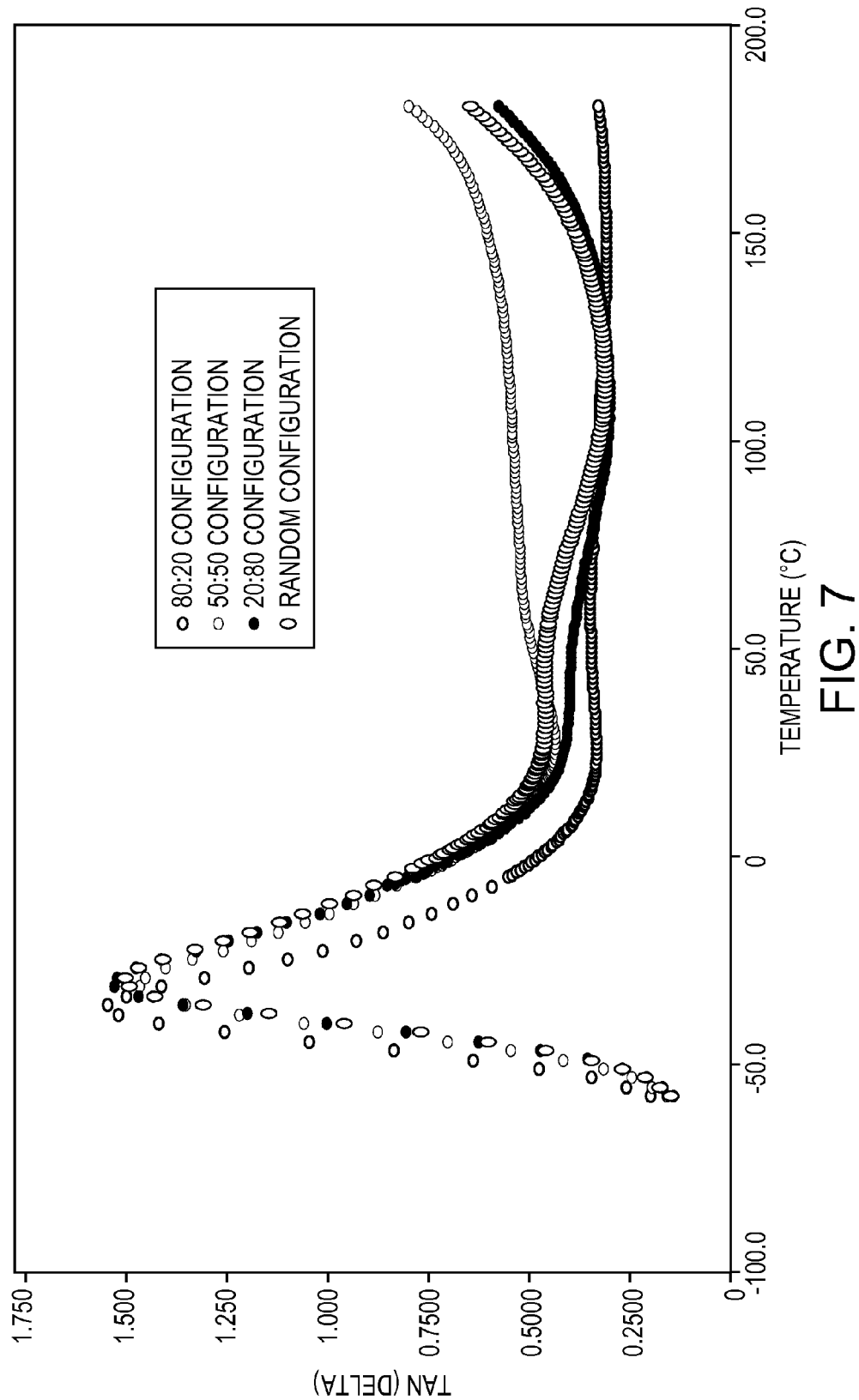
FIG. 7 is a graph of Tan (Delta) as a function of temperature of various samples and a control using the same extent of cross-linking, yet different placement configurations of a reactive functional group.

Investigation of Properties of a Preferred Embodiment Adhesive Comprising Segmented Acrylic Polymer Having Staged Acrylic Acid Functionality formed by SFRP and Metal Complex Polymerization Catalyst Acrylic copolymers formed from 51% 2-ethylhexyl acrylate, 45% n-butyl acrylate, and 4% acrylic acid as a functional group were prepared with varying distributions of acrylic acid within the polymer, i.e. (i) 80% of acrylic acid in the end blocks and 20% acrylic acid in the mid-block, (ii) 50% of acrylic acid in the end blocks and 50% acrylic acid in the mid-block, and (iii) 20% of the acrylic acid in the end blocks and 80% of the acrylic acid in the mid-block. These polymers were prepared using stable free radical polymerization (SFRP) techniques described herein. A control polymer having identical proportions of monomers and the acrylic acid functional group was formed, however using conventional random polymerization techniques. All poly- FIGS. 2-7 graphically illustrate the data presented in Table 7. Specifically, FIG. 2 is a column plot of 180° peels from stainless steel of samples formed with the same extent of cross-linking, but different placement configurations of the reactive functional group. FIG. 3 is a column plot of 180° peels from polypropylene of samples formed with the same extent of cross-linking, but different placement configurations of the reactive functional group. FIG. 4 is a graph illustrating Williams Plasticity Index (WPI) of the samples formed with the same extent of cross-linking, but different placement configurations of the reactive functional group. FIG. 5 is a column plot of shear adhesion failure temperature (SAFT) of the various samples and control under discussion. FIG. 6 is a graph illustrating static shear measurements using a 1 inch by ½ inch area and 1 kg of force for the samples and control under discussion. FIG. 7 is a graph of Tan (Delta) as a function of temperature of the various samples and control under discussion.

Example 6

Investigation of Properties of a Preferred Embodiment Adhesive Comprising Segmented Acrylic Polymer Having Staged Acrylic Acid Functionality formed by SFRP and Metal Complex Polymerization Catalyst Acrylic copolymers formed from 51% 2-ethylhexyl acrylate, 45% n-butyl acrylate, and 4% acrylic acid as a functional group were prepared with varying distributions of acrylic acid within the polymer, i.e. (i) 80% of acrylic acid in the end blocks and 20% acrylic acid in the mid-block, (ii) 50% of acrylic acid in the end blocks and 50% acrylic acid in the mid-block, and (iii) 20% of the acrylic acid in the end blocks and 80% of the acrylic acid in the mid-block. A control polymer having identical proportions of monomers and the acrylic acid functional group was formed, however using conventional random polymerization techniques. The polymers were cross-linked using different amounts by weight, i.e. 0.80%, 0.44%, and 0.83%, (based upon the weight of the polymer) of 1:3:9 aluminum acetylacetonate (AlAcAc). All polymers were cross-linked to achieve a Williams Plasticity Index (WPI) of from 3.3 to 3.7.

Samples containing the cross-linked polymers were prepared by direct coating the polymerized and cross-linked material onto Mylar substrates 2 mil in thickness at a coating weight of 60 gsm. The coated samples were air dried for 10 minutes and then oven dried for 10 minutes at 140° C.

The four sets, i.e. sample sets (i)-(iii) and the controls, were then subjected to three 180° peel tests, a static shear test, and a Williams Plasticity test. The results of these tests are set forth below in Table 8.

Example 7

Investigation of Properties of a Preferred Embodiment Adhesive Comprising Segmented Acrylic Polymer Having Staged PAMA Functionality Acrylic copolymers formed from 70% 2-ethylhexyl acrylate, 20% isobornyl acrylate, and 10% 2-methacryloxyethylphthalic acid (PAMA) as a functional group were prepared with varying distributions of PAMA within the polymer, i.e. (i) 70% of the PAMA in the end blocks and 30% of the PAMA in the mid-block (ii) 50% PAMA in the end blocks and 50% PAMA in the mid-block, and (iii) 30% PAMA in the end blocks and 70% PAMA in the mid-block. A control

TABLE 8

Test Results

| Test | 200k g/mole *Control 0.80% AlAcAc | 200k g/mole 80:20 acid 0.44% AlAcAc | 200k g/mole 50:50 acid 0.80% AlAcAc | 200k g/mole 20:80 acid 0.83% AlAcAc |
|---|---|---|---|---|
| 180° Peel to Stainless Steel 15 min Dwell (Lbs/in) | 2.52 | 4.34 | 7.64 Heavy Transfer | 2.36 |
| 180° Peel to Stainless Steel 72 hr Dwell (Lbs/in) | 4.21 | 7.20 Partial Transfer | 8.64 Split Transfer | 3.55 |
| 180° Peel to Polypropylene 72 hr Dwell (Lbs/in) | 1.05 | 1.81 | 2.52 | 1.01 |
| ½" × 1" × 1 kg minutes (Avg) | 3244.4 Adhesive | 10,000+ Removed | 3566.8 Cohesive | 4168.77 Adhesive |
| Williams Plasticity Index (mm) | 3.29 | 3.70 | 3.53 | 3.50 |

Figure 8:
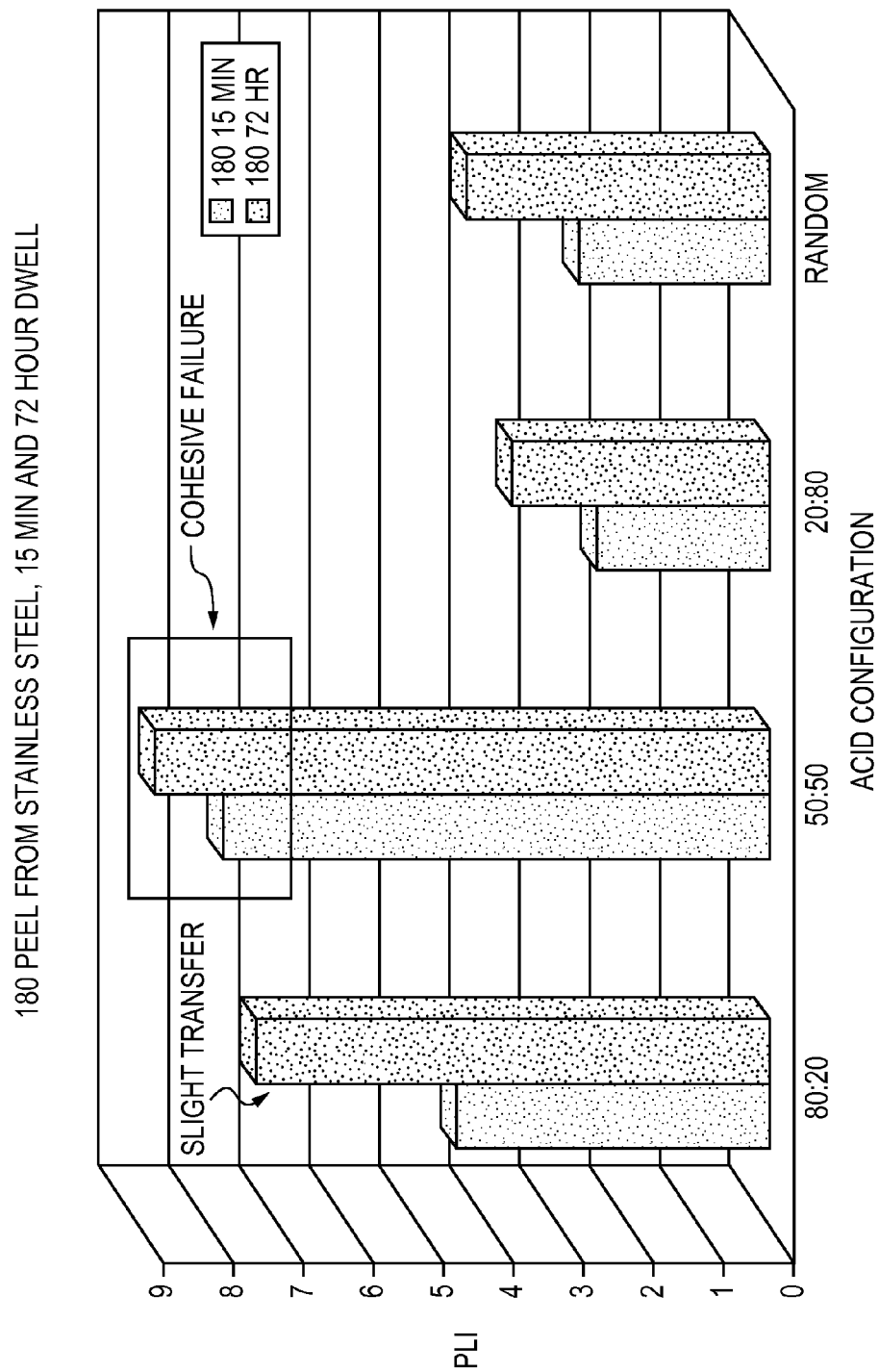
FIG. 8 is a graph of 180° C. peel tests of various samples and a control adhesive having the same Williams Plasticity Index (WPI), but different placement configurations of a reactive functional group.
Figure 9:
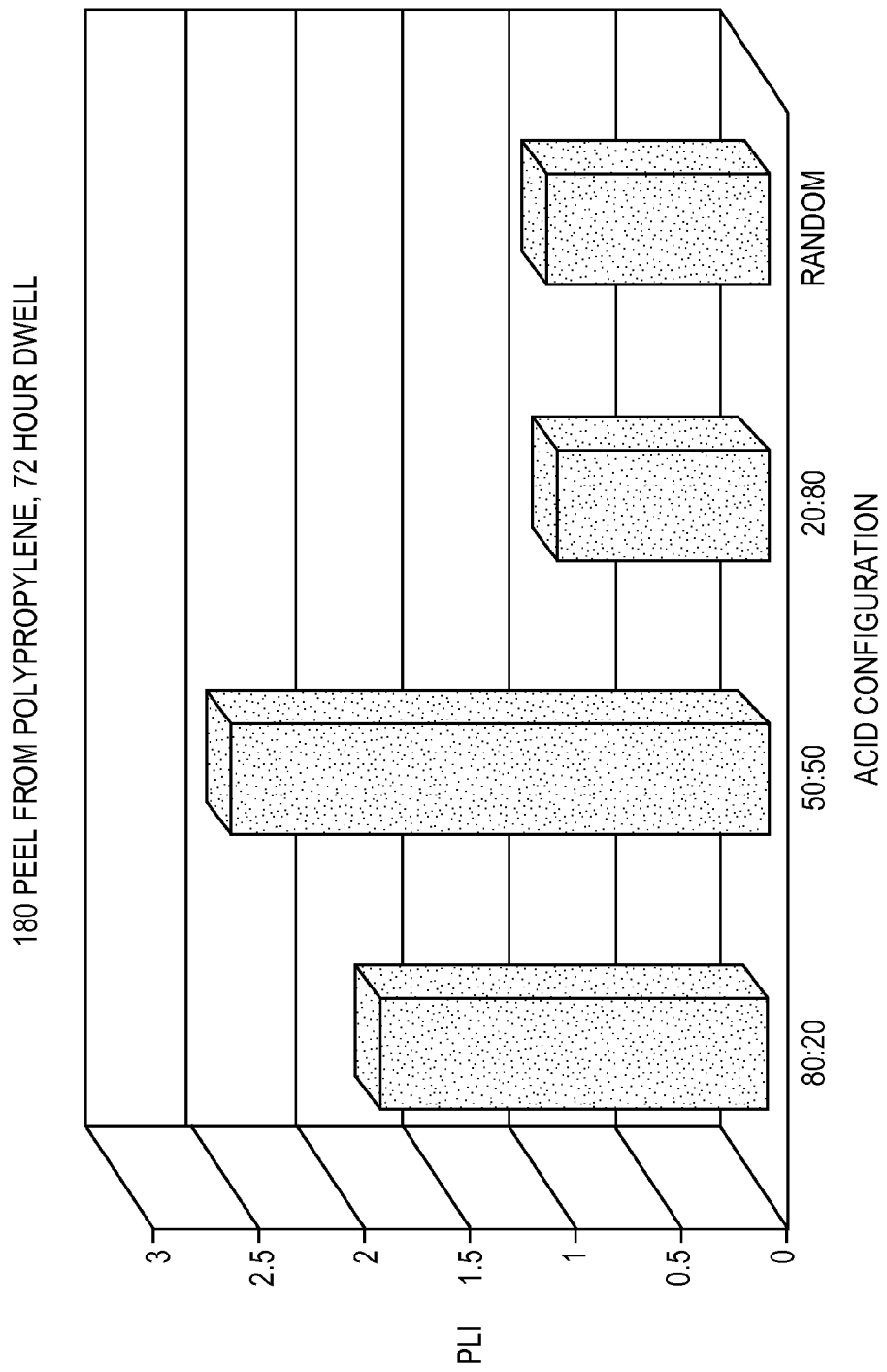
FIG. 9 is a graph of 180° C. peel tests of various samples and a control adhesive having the same WPI, but different placement configurations of a reactive functional group.
Figure 10:
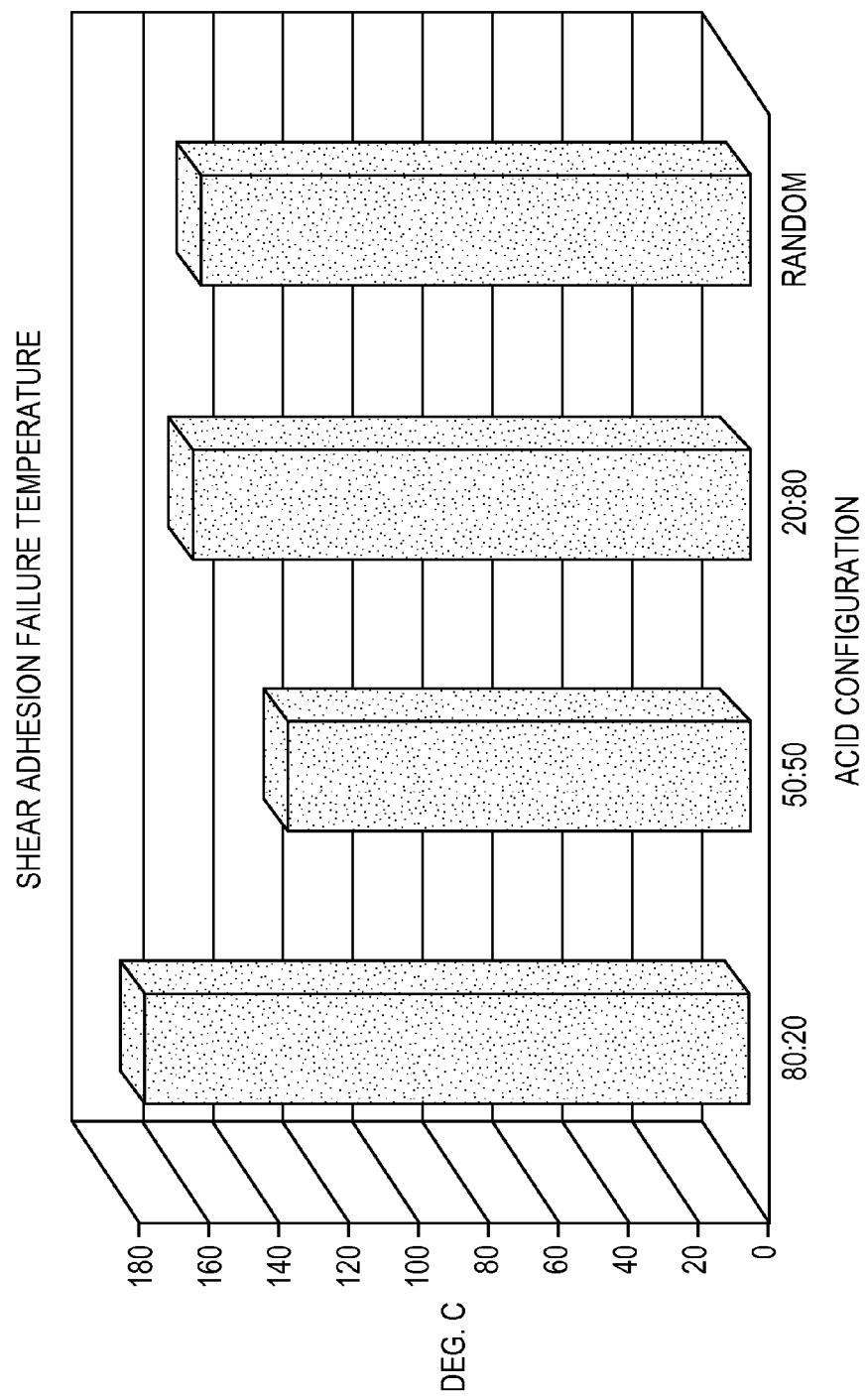
FIG. 10 is a graph of shear adhesion failure temperatures of various samples and a control adhesive having the same WPI, but different placement configurations of a reactive functional group.
Figure 11:
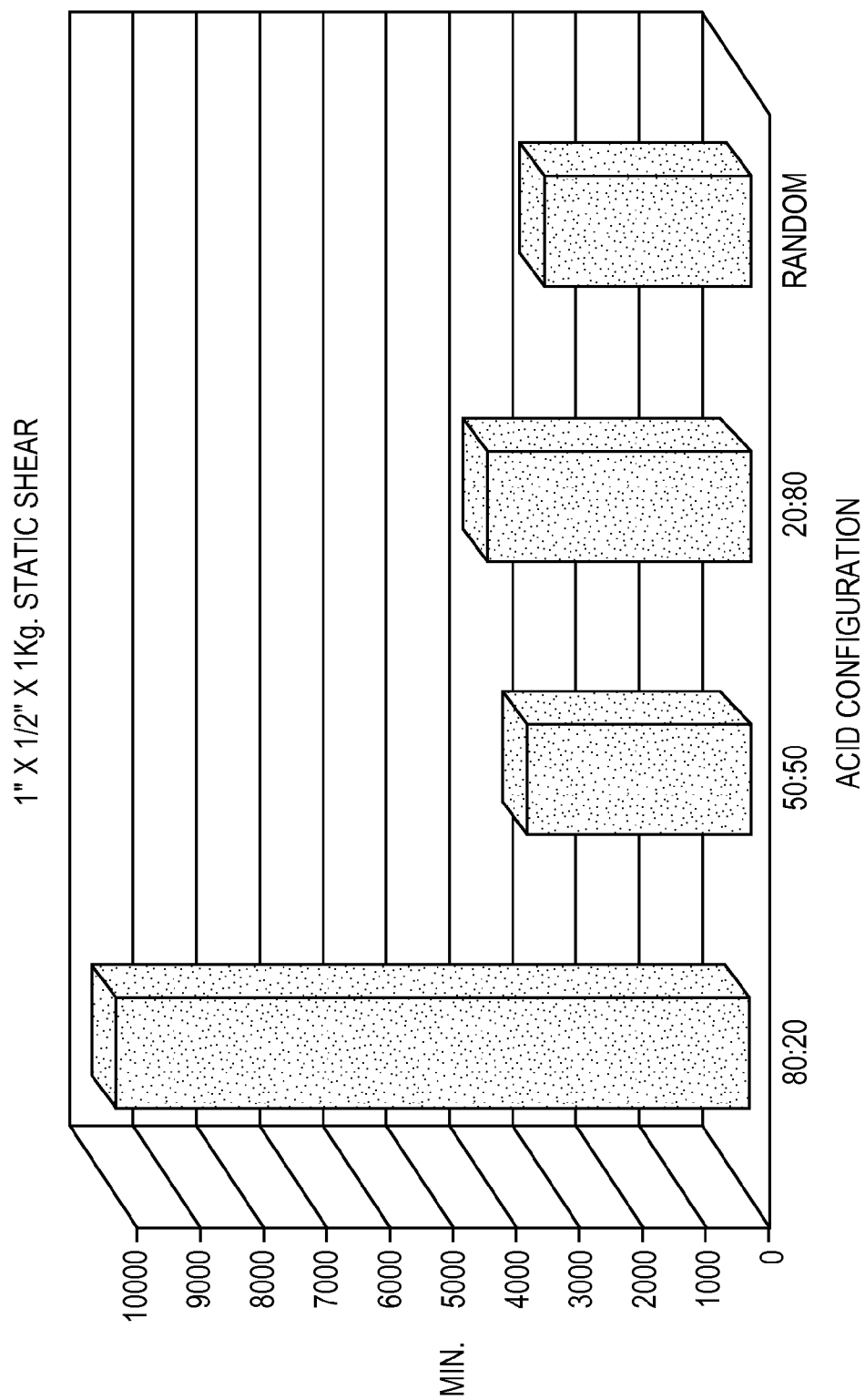
FIG. 11 is a graph of static shear measurements of various samples and a control having the same WPI, but different placement configurations of a reactive functional group.
Figure 12:
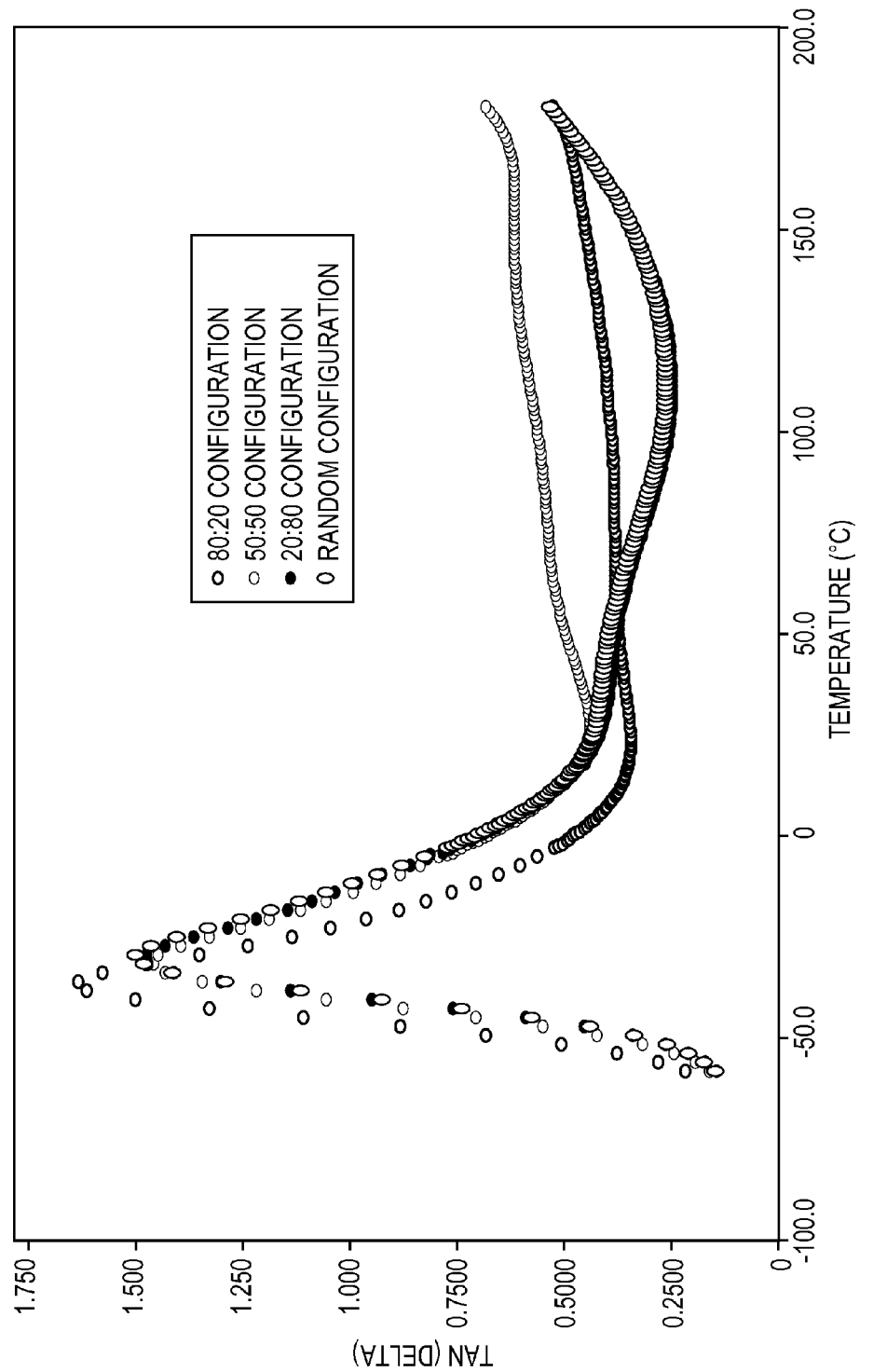
FIG. 12 is a graph of Tan (Delta) as a function of temperature of various samples and a control having the same WPI, yet different placement configurations of a reactive functional group.

FIGS. 8-12 graphically illustrate the data presented in Table 8. Specifically, FIG. 8 is a column plot of 180° peels from stainless steel of samples exhibiting the same WPI, but different placement configurations of the reactive functional group. FIG. 9 is a column plot of 180° peels from polypropylene of samples formed with the same WPI, but different placement configurations of the reactive functional group. FIG. 10 is a column plot of shear adhesion failure temperature (SAFT) of the various samples and control under discussion. FIG. 11 is a graph illustrating static shear measurements using a 1 inch by ½ inch area and 1 kg of force for the samples and control under discussion. FIG. 12 is a graph of Tan (Delta) as a function of temperature of the various samples and control under discussion.

polymer having identical proportions of monomers and the PAMA functional group was formed, however using conventional random polymerization techniques. The polymers were cross-linked using different amounts by weight, i.e. 1.30% and 1.00% (based upon the weight of the polymer) of 1:3:9 aluminum acetylacetonate (AlAcAc).

Samples containing the cross-linked polymers were prepared by direct coating the polymerized and cross-linked material onto Mylar substrates 2 mil in thickness at a coating weight of 60 gsm. The coated samples were air dried for 10 minutes and then oven dried for 10 minutes at 140° C.

The four sets, i.e. sample sets (i)-(iii) and the controls, were then subjected to three 180° peel tests, a static shear test, and a Williams Plasticity test. The results of these tests are set forth below in Table 9.

TABLE 9

Test Results

| Test | 200k g/mole *Control 1.30% AlAcAc | 200k g/mole 70:30 acid 1.00% AlAcAc | 200k g/mole 50:50 acid 1.30% AlAcAc | 200k g/mole 30:70 acid 1.00% AlAcAc |
|---|---|---|---|---|
| 180° Peel to Stainless Steel 15 min Dwell (Lbs/in) | 2.51 | 4.08 | 5.24 | 4.48 |
| 180° Peel to Stainless Steel 72 hr Dwell (Lbs/in) | 3.97 | 4.21 | 4.31 | 5.95 |
| 180° Peel to Polypropylene 72 hr Dwell (Lbs/in) | 1.66 | 3.10 | 2.93 | 2.71 |
| ½" × 1" × 1 kg minutes (Avg) | 7404.65 Cohesive | 2913.43 Adhesive | 4580.2 Adhesive | 10000 Removed |
| Williams Plasticity Index (mm) | 4.18 | 3.10 | 3.55 | 4.31 |

Figure 13:
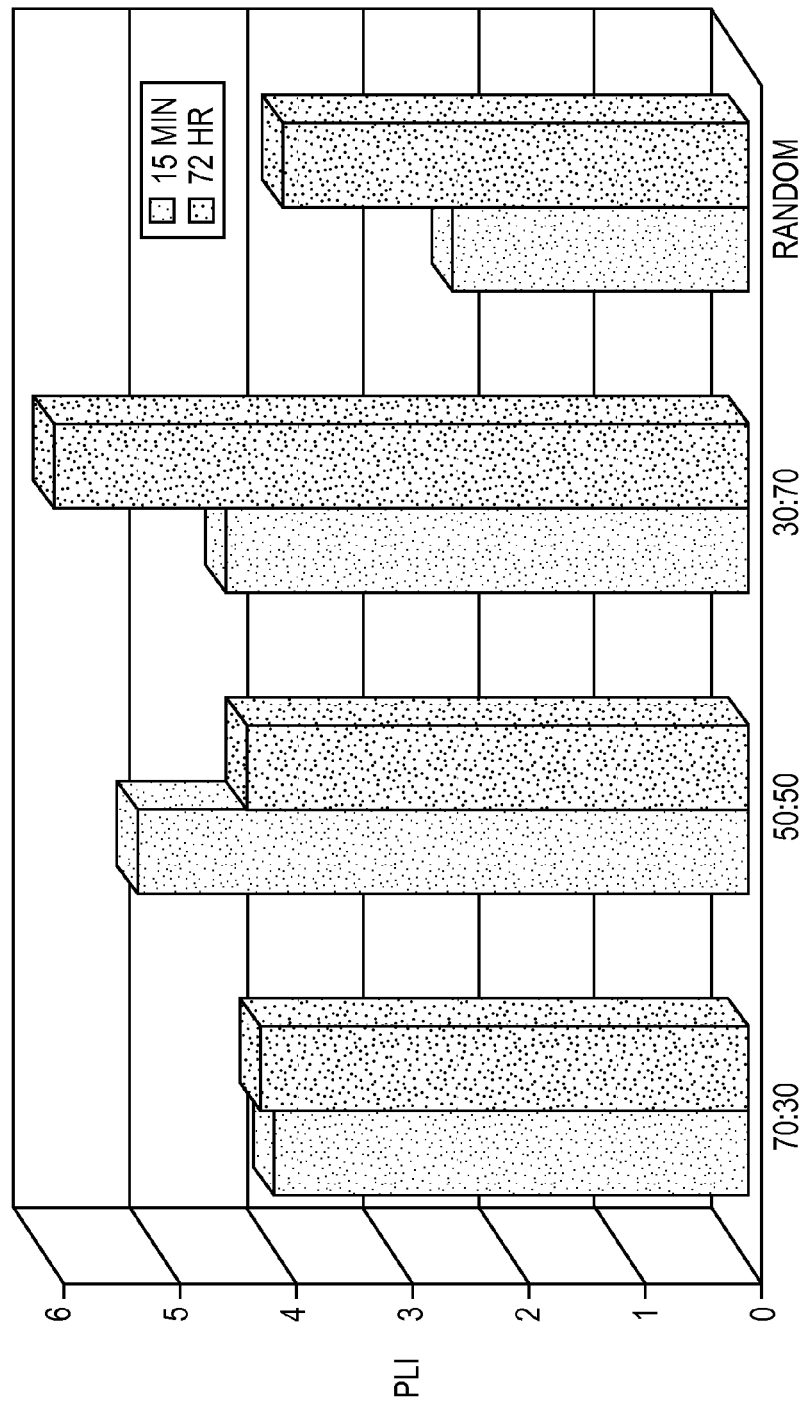
FIG. 13 is a graph of 180° C. peel tests of various samples and a control adhesive having different placement configurations of a reactive functional group.
Figure 14:
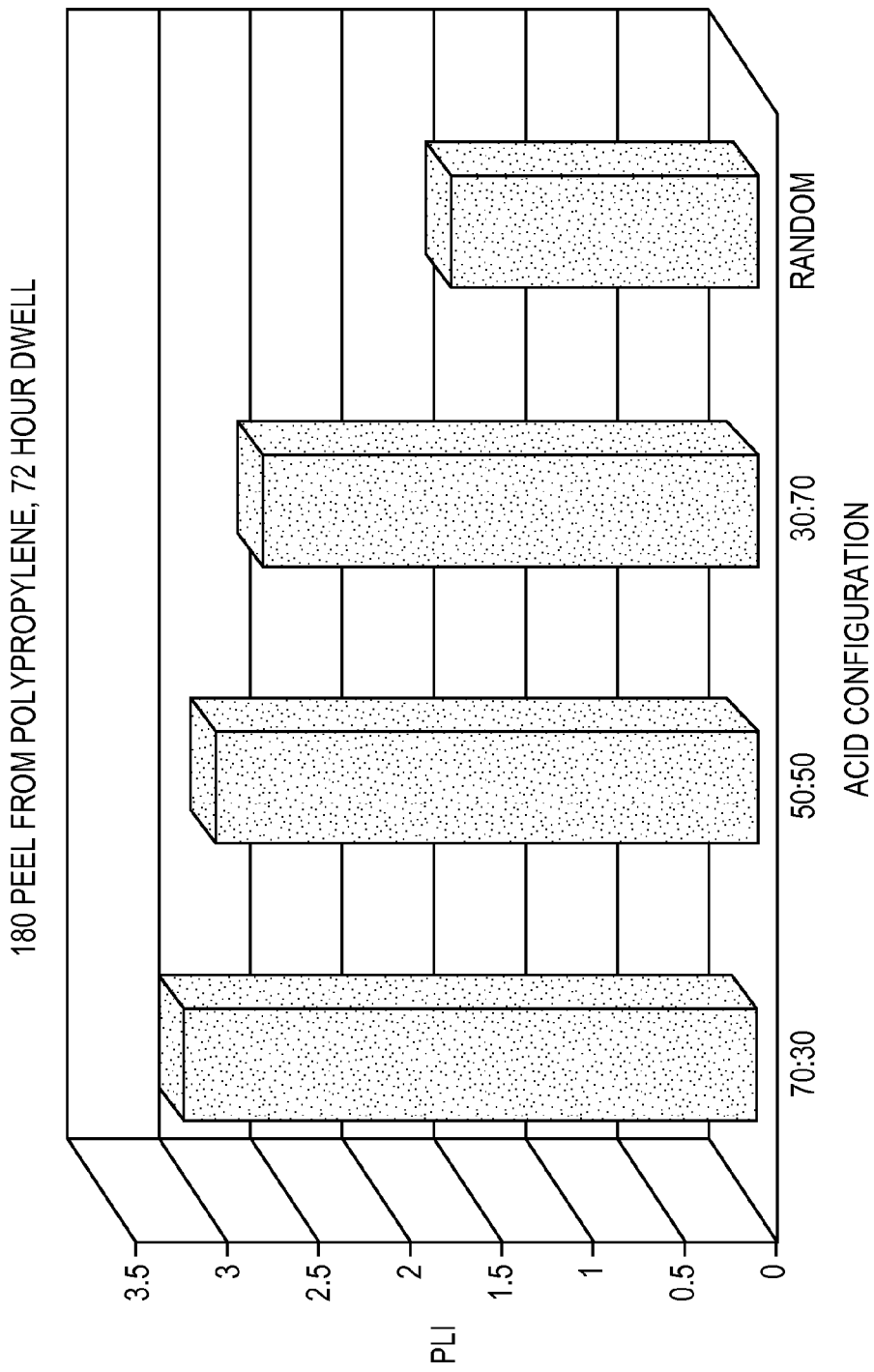
FIG. 14 is a graph of 180° C. peel tests of various samples and a control adhesive having different placement configurations of a reactive functional group.
Figure 15:
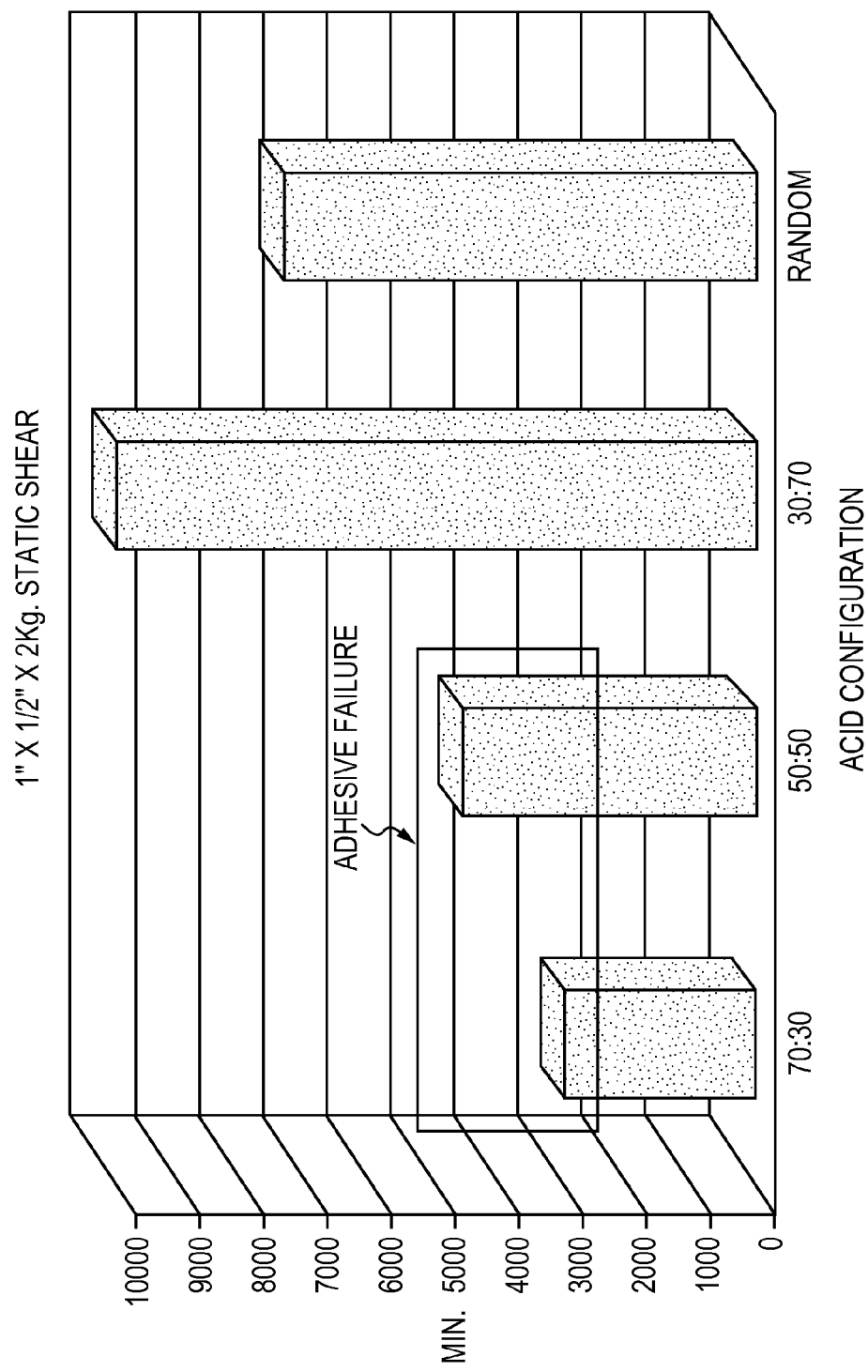
FIG. 15 is a graph of static shear measurements of various samples and a control having different placement configurations of a reactive functional group.

FIGS. 13-15 graphically illustrate the data presented in Table 9. Specifically, FIG. 13 is a column plot of 180° peels from stainless steel of samples having different placement configurations of the reactive functional group. FIG. 14 is a column plot of 180° peels from polypropylene of samples having different placement configurations of the reactive functional group. FIG. 15 is a graph illustrating static shear measurements using a 1 inch by ½ inch area and 1 kg of force for the samples and control under discussion.

Many other benefits will no doubt become apparent from future application and development of this technology.

All patents, published applications, and articles noted herein are hereby incorporated by reference in their entirety.

It will be understood that any one or more feature, step, or component of one embodiment described herein can be combined with one or more other features, steps, or components of another embodiment. Thus, the present invention includes any and all combinations of components or features, steps of the embodiments described herein.

As described hereinabove, the present invention solves many problems associated with previous strategies and methods. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. An ordered polymer comprising at least two different blocks, including one or more blocks A placed at a first region within the polymer and one or more blocks B placed at a second region within the polymer, and at least one reactive functional group apportioned between the blocks A and B wherein an amount of the at least one reactive functional group in both blocks A and B is apportioned between the blocks A and Bin an apportionment ratio of from about 6:1 to about 10,000:1,
wherein the glass transition temperature (Tg) of the ordered polymer is about −45° C. to about −60° C.

2. The ordered polymer of claim 1 wherein the apportionment ratio is from 6:1 to 1,000:1.

3. The ordered polymer of claim 1 wherein the apportionment ratio is from 6:1 to 100:1.

4. The ordered polymer of claim 1 wherein the block A comprises a monomer selected from the group consisting of acrylate monomers, methacrylate monomers, and combinations thereof; and the block B including a polymerizable acrylate comonomer, the blocks A and B including at least one reactive functional group selected from the group consisting of acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, silyl groups, carboxyl groups, carbonyl groups, carbonate ester groups, isocyanato groups, amino groups, amide groups, imide groups, mercapto groups, acetoacetyl groups, and combinations thereof.

5. The ordered polymer of claim 1 wherein the polymer has a number average molecular weight of from about 10,000 to about 300,000.

6. The ordered polymer of claim 1 wherein the polymer has a number average molecular weight of from about 50,000 to about 200,000.

7. The ordered polymer of claim 1 wherein the polymer has a number average molecular weight of from about 100,000 to about 150,000.

8. The ordered polymer of claim 1 wherein the first region is an end region of a polymer and the second region is a middle region of the polymer.

9. The ordered polymer of claim 1 wherein the first region is a middle region of the polymer and the second region is an end region of the polymer.

10. The ordered polymer of claim 1 wherein the glass transition temperature (Tg) of the one or more blocks A is about −28° C. to about −46° C.

11. The ordered polymer of claim 1 wherein the glass transition temperature (Tg) of the one or more blocks B is about −47° C. to about −61° C.

12. A pressure sensitive adhesive composition comprising:
an ordered polymer including at least two different blocks, including one or more blocks A placed at a first region within the polymer and one or more blocks B placed at a second region within the polymer, and at least one reactive functional group apportioned between the blocks A and B wherein an amount of the at least one reactive functional group in both blocks A and B is apportioned between the blocks A and Bin an apportionment ratio of from about 6:1 to about 10,000:1; and
a crosslinking agent,
wherein the glass transition temperature (Tg) of the ordered polymer is about −45° C. to about −60° C.

13. The adhesive composition of claim 12 wherein the apportionment ratio is from 6:1 to 1,000:1.

14. The adhesive composition of claim 12 wherein the apportionment ratio is from 6:1 to 100:1.

15. The adhesive composition of claim 12 wherein the polymer has a number average molecular weight of from about 10,000 to about 300,000.

16. The adhesive composition of claim 12 wherein the polymer has a number average molecular weight of from about 50,000 to about 200,000.

17. The adhesive composition of claim 12 wherein the polymer has a number average molecular weight of from about 100,000 to about 150,000.

18. The adhesive composition of claim 12 wherein the composition further comprises at least one agent selected from the group consisting of tackifiers, plasticizers, antioxidants, pH controllers, medicaments, bactericides, growth factors, wound healing components, deodorants, perfumes, antimicrobials, fungicides, cutting agents, pigments, filler, diluents, flame retardants, and combinations thereof.

19. The adhesive composition of claim 12 wherein the first region is an end region of a polymer and the second region is a middle region of the polymer.

20. The adhesive composition of claim 12 wherein the first region is a middle region of the polymer and the second region is an end region of the polymer.

21. The adhesive composition of claim 12 wherein the glass transition temperature (Tg) of the one or more blocks A is about −28° C. to about −46° C.

22. The adhesive composition of claim 12 wherein the glass transition temperature (Tg) of the one or more blocks B is about −47° C. to about −61° C.

23. The adhesive composition of claim 12 wherein the crosslinking agent is from about 0.05% to about 5% by weight of adhesive solids.

24. The adhesive composition of claim 12 wherein the crosslinking agent is aluminum acetyl acetonoate.

25. The adhesive composition of claim 12 wherein the block A comprises a monomer selected from the group consisting of acrylate monomers, methacrylate monomers, and combinations thereof; and the block B including a polymerizable acrylate comonomer, the blocks A and B including at least one reactive functional group selected from the group consisting of acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, silyl groups, carboxyl groups, carbonyl groups, carbonate ester groups, isocyanato groups, amino groups, amide groups, imide groups, mercapto groups, acetoacetyl groups, and combinations thereof.

26. A pressure sensitive adhesive composition comprising:
an ordered polymer including at least two different blocks, including one or more blocks A placed at a first region within the polymer and one or more blocks B placed at a second region within the polymer, and at least one reactive functional group apportioned between the blocks A and B wherein an amount of the at least one reactive functional group in both blocks A and B is apportioned between the blocks A and B in an apportionment ratio of from about 6:1 to about 10,000:1, and a crosslinking agent,
wherein the first region is an end region of the polymer and the second region is a middle region of the polymer.

27. The adhesive composition of claim 26 wherein the block A comprises a monomer selected from the group consisting of acrylate monomers, methacrylate monomers, and combinations thereof; and the block B including a polymerizable acrylate comonomer, the blocks A and B including at least one reactive functional group selected from the group consisting of acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, silyl groups, carboxyl groups, carbonyl groups, carbonate ester groups, isocyanato groups, amino groups, amide groups, imide groups, mercapto groups, acetoacetyl groups, and combinations thereof.

* * * * *